(12) United States Patent
Oki et al.

(10) Patent No.: US 7,313,094 B2
(45) Date of Patent: Dec. 25, 2007

(54) NODE, AN OPTICAL/ELECTRICAL PATH INTEGRATED NETWORK USING THE NODE, AND A PROGRAM WHICH CONTROLS THE NODE

(75) Inventors: Eiji Oki, Tokyo (JP); Kohei Shiomoto, Iruma (JP); Masaru Katayama, Tokyo (JP); Wataru Imajuku, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1075 days.

(21) Appl. No.: 10/368,982

(22) Filed: Feb. 18, 2003

(65) Prior Publication Data

US 2003/0156536 A1 Aug. 21, 2003

(30) Foreign Application Priority Data

Feb. 21, 2002 (JP) ............................. 2002-045092
Feb. 28, 2002 (JP) ............................. 2002-054247

(51) Int. Cl.
*H04L 12/56* (2006.01)

(52) U.S. Cl. ..................... 370/238; 370/252; 370/401

(58) Field of Classification Search ............... 370/400, 370/229, 232, 252, 253, 238, 254, 255, 401, 370/351
See application file for complete search history.

(56) References Cited

U.S. PATENT DOCUMENTS 6,665,495 B1* 12/2003 Miles et al. .............. 398/54
6,804,196 B1* 10/2004 Kadengal .................. 370/230
6,829,437 B2* 12/2004 Kirby ...................... 398/57
7,152,115 B2* 12/2006 Ould Brahim et al. ..... 709/238
2003/0072052 A1* 4/2003 Graves et al. ............. 359/124
2003/0126246 A1* 7/2003 Blouin et al. .............. 709/223

FOREIGN PATENT DOCUMENTS

| EP | 1152631 A2 | 11/2001 |
|----|------------|---------|
| JP | 10-242989 | 9/1998 |
| JP | 2001-197083 | 7/2001 |
| JP | 2002-026990 | 1/2002 |

OTHER PUBLICATIONS

"OSPF Version 2", J. Moy, IETF RFC 2328, Apr. 1998, pp. 1-244.
"The OSPF Opaque LSA Option", R. Coltun, IETF RFC 2370, Jul. 1998, pp. 1-15.
"Generalized Multiprotocol Label Switching: An Overview of Routing and Management Enhancements", A. Banerjee, et al., IEEE Communications Magazine, Jan. 2001, pp. 144-150.

(Continued)

*Primary Examiner*—Min Jung
(74) *Attorney, Agent, or Firm*—Harness, Dickey & Pierce, P.L.C.

(57) ABSTRACT

The invention relates to a node, an optical/electrical path integrated network using this node, and a program which controls the node. The node according to the invention is suited to use in an optical/electrical path integrated network constructed from a plurality of electrical sub-networks comprising nodes which are interconnected by electrical paths in which routing is performed based on packet header information and a photonic core network comprising nodes which are interconnected by optical paths, the photonic core network and the plurality of electrical sub-networks being interconnected by optical paths, wherein the node comprises a device which outputs to other nodes, a traffic quantity between the node to which it belongs and other nodes.

44 Claims, 24 Drawing Sheets

OTHER PUBLICATIONS

"Generalized Multiprotocol Label Switching: An Overview of Signaling Enhancements and Recovery Techniques", A. Banerjee, et al., IEEE Communications Magazine, Jul. 2001, pp. 144-151.

"OSPF Extensions in Support of Generalized MPLS", Internet Draft, draft-ietf-ccamp-ospf-gmpls-extensions-08.txt (work in progress), K. Kompella, et al., Aug. 2002, pp. 1-12.

"Multi-Layer Traffic Engineering in Phototonic IP Networks", E. Oki, et al., The Institute of Electronics, Information and Communication Engineers, Technical Report of IEICE, PS2001-102, Jan. 18, 2002, pp. 43-46.

"A Heuristic Multi-Layer Optimum Topology Design Scheme Based on Traffic Measurement for IP+Photonic Networks", E. Oki, et al., Proc. of Optical Fiber Communications (OFC) 2002, Mar. 2002, pp. 104-105.

"Multi-Layer Traffic Engineering GMPLS Networks", E. Oki, et al., The Institute of Electronics, Information and Communication Engineers, B-7-118, Mar. 2001, p. 345.

"GMPLS-Based Photonic Multilayer Router (Hiraki Router) Architecture: An Overview of Traffic Engineering and Signaling Technology", K. Sato, et al., IEEE Communications Magazine, vol. 40, No. 3, Mar. 2002, pp. 96-101.

"Traffic engineering and signaling technologies in photonic-GMPLS-router networks", N. Yamanaka, et al., 2002 Workshop on High Performance Switching and Routing, May 2002, pp. 142-146.

"Dynamic multi-layer traffic engineering in GMPLS networks", K. Shiomoto, et al., Proc. World Telecommunications Congress 2002, Paris, France, Sep. 2002, pp. 1-6.

"Impact of Multimedia Traffic Characteristics on ATM Network Configuration", E. Oki, et al., Journal of Network Systems Management, vol. 6, No. 4, 1998, pp. 377-398.

"Dynamic multi-layer traffic engineering in MPLambdaS networks—The Format of Technical Report (Subtitle)", K. Shiomoto, et al., Technical Report of IEICE, PS2002-10, Apr. 2002, pp. 55-60.

M. Miyabe et al., "A study of the GMPLS control architecture for IP photonic network", Technical Report of IEICE (NS2001-180), vol. 101, No. 508, pp. 61-66, Dec. 10, 2001).

K. Shiomoto et al., "Study on photonic IP network architecture", Technical Report of IEICE (NS2001-191), vol. 101, No. 508, pp. 127-132, Dec. 10, 2001).

* cited by examiner

FIG. 18

TRAFFIC MATRIX $$\begin{pmatrix} \gamma_{1,1} & \gamma_{1,2} & \cdots & \gamma_{1,N} \\ \gamma_{2,1} & \gamma_{2,2} & \cdots & \gamma_{2,N} \\ \vdots & \vdots & & \vdots \\ \gamma_{N,1} & \gamma_{N,2} & \cdots & \gamma_{N,N} \end{pmatrix}$$

FIG. 19

E-LSP HOP COUNT MATRIX $$\begin{pmatrix} h_{1,1} & h_{1,2} & \cdots & h_{1,N} \\ h_{2,1} & h_{2,2} & \cdots & h_{2,N} \\ \vdots & \vdots & & \vdots \\ h_{N,1} & h_{N,2} & \cdots & h_{N,N} \end{pmatrix}$$

NODE, AN OPTICAL/ELECTRICAL PATH INTEGRATED NETWORK USING THE NODE, AND A PROGRAM WHICH CONTROLS THE NODE

BACKGROUND OF THE INVENTION

1. Field of the Invention

The present invention relates to optical/electrical path integrated networks, and relates specifically to a technique for notifying about information relating to traffic quantity between sub-networks, and a technique for dynamically establishing and releasing optical paths according to the traffic quantity between sub-networks.

This application is based on patent application No. 2002-045092 and No. 2002-054247 filed in Japan, the contents of which are incorporated herein by reference.

2. Description of the Related Art

Research and development is proceeding in the field of optical/electrical path integrated networks, as a technology for building high capacity networks. In an optical/electrical path integrated network, the transmission/reception endpoints are connected by optical paths. An electrical sub-network comprising a node which performs routing based on packet header information is connected to each of the transmission/reception endpoints. A first conventional example of an optical/electrical path integrated network is shown in FIG. 6.

The optical/electrical path integrated network comprises a photonic core network C and electrical sub-networks S1 to S4. The electrical sub-networks S1 to S4 must be connected by optical paths for communication to occur.

The photonic core network C comprises photonic border nodes and a photonic core node. The electrical sub-networks S1 to S4 comprise electrical border nodes and electrical core nodes. The electrical core nodes and the photonic core node are contiguous at the boundary of the electrical sub-networks S1 to S4 and the photonic core network C, and are interconnected by optical fiber links.

Optical paths are established over the photonic core network C, so as to interconnect the electrical border nodes provided in the different electrical sub-networks S1 to S4. Information is transferred transparently between the electrical border nodes over the optical paths.

When four optical paths are established as in FIG. 6, the view of the electrical sub-networks S1 to S4 is as shown in FIG. 7. FIG. 7 shows a view of a network topology comprising nodes which are capable of performing packet processing, in which the topology of the photonic core network C is hidden. FIG. 8 is a combined view of the electrical sub-networks S1 to S4 and the photonic core network C.

The electrical sub-networks must be interconnected. However, it is not necessary for all of the electrical sub-networks to be directly connected to each other by optical paths, and multiple hop routing may be used.

FIG. 9 shows an example of the connection of the four electrical sub-networks S1 to S4 in FIG. 6. The electrical sub-network S1 is connected to the electrical sub-networks S2 and S3 by a direct optical path, the electrical sub-network S2 is connected to the electrical sub-networks S1 and S4, the electrical sub-network S3 is connected to the electrical sub-networks S1 and S4, and the electrical sub-network S4 is connected to the electrical sub-networks S2 and S3, each by direct optical paths.

To transmit a packet from the electrical sub-network S1 to the electrical sub-network S4, the packet can travel from the electrical sub-network S1 to the electrical sub-network S4 via the electrical sub-network S2, or from the electrical sub-network S1 to the electrical sub-network S4 via the electrical sub-network S3, by multi-hop routing. In the same manner as FIG. 9, FIG. 10 shows an example of the connection of the four electrical sub-networks S1 to S4 in FIG. 6. Diagonal optical paths are established between the electrical sub-networks S1 and S4, and between the electrical sub-networks S2 and S3.

In both FIG. 9 and FIG. 10, the electrical border router of each electrical sub-network S1 to S4 has two electrical packet transmission/reception ports connected to the photonic core network C. How the two electrical packet transmission/reception ports provided in each of the electrical border routers should be directly connected by optical paths is determined by the traffic quantity between the electrical sub-networks S1 to S4. FIG. 9 is favorable when the traffic quantity over the diagonal paths is small, and conversely FIG. 10 is favorable when such traffic is high.

If the optical paths are established without taking the traffic quantity into consideration, then for example electrical sub-networks which exchange a high quantity of traffic may not be directly connected by an optical path, making it necessary to transfer packets by multi-hop routing, which causes a problem of congestion of the optical paths.

Furthermore, an optical/electrical path integrated network is shown in FIG. 23 as a second conventional example. This optical/electrical path integrated network is constructed from the photonic core network C and the electrical sub-networks S1 to S4. The optical/electrical path integrated network in FIG. 23 is a multi-layer network, in which optical paths are established over the photonic core network C. In this manner, the group of electrical sub-networks S1 to S4, connected by optical paths, constitutes the entire electrical network.

The photonic core network C comprises photonic border nodes 1A to 6A and a photonic core node 7A. The electrical sub-networks S1 to S4 comprise electrical border nodes 11A, 12A, 21A, 22A, 30A, 32A and 40A, and electrical core nodes 10A, 20A, 31A, 41A and 42A. The electrical border nodes 11A, 12A, 21A, 22A, 30A, 32A, 40A and the photonic border nodes 1A to 6A are contiguous at the boundary between the electrical sub-networks S1 to S4 and the photonic core network C, and are interconnected by optical fiber links. The optical paths are established over the photonic core network C, to interconnect the electrical border nodes 11A, 12A, 21A, 22A, 30A, 32A, 40A in the different electrical sub-networks S1 to S4. Information is transmitted between the electrical border nodes 11A, 12A, 21A, 22A, 30A, 32A and 40A transparently over the optical paths.

The topology of the electrical network can be virtually changed, depending on which of the electrical sub-networks S1 to S4 are connected. FIG. 24 shows how two different electrical network topologies can be realized when a single optical path network topology is applied. Furthermore, FIG. 24 describes the hierarchy of the optical paths and the electrical paths. In FIG. 24, O-LSP (Optical-Label Switched Path) indicates an optical path, and E-LSP (Electric-Label Switched Path) indicates an electrical path.

The E-LSP is routed over the electrical network, comprising the electrical sub-networks S1 to S4 which are interconnected by O-LSPS. In the connection mode #1 on the right side of FIG. 24, the E-LSP is connected by multi-hop routing. In other words, two electrical sub-networks are connected via two O-LSPs. On the other hand, in the connection mode #2 on the left side of FIG. 24, the E-LSP is connected by a single hop. In other words, two electrical sub-networks are connected via a single O-LSP.

In the terminology of graph theory, the entire electrical network must be "connected". In other words, the electrical sub-networks S1 to S4 must be interconnected by O-LSPs. However, it is not necessary for every one of the electrical sub-networks S1 to S4 to be connected to every other by an O-LSP, and multi-hop routing may also be used. FIG. 25 shows a connected electrical network and an unconnected electrical network. In the connected electrical network, all four of the electrical sub-networks S1 to S4 can communicate via O-LSPs, but in the unconnected electrical network only three of the electrical sub-networks are connected by O-LSPs, and one of the electrical sub-networks cannot communicate with the other three electrical sub-networks via an O-LSP.

FIG. 16 shows an example in which the four electrical sub-networks S1 to S4 in FIG. 25 are connected. The electrical sub-network S1 is connected to the electrical sub-networks S2 and S3 by direct optical paths, the electrical sub-network S2 is connected to the electrical sub-networks S1 and S4, the electrical sub-network S3 is connected to the electrical sub-networks S1 and S4, and the electrical sub-network S4 is connected to the electrical sub-networks S2 and S3, each by direct optical paths. In order to transmit a packet from the electrical sub-network S1 to the electrical sub-network S4, the packet can be transferred from the electrical sub-network S1 to the electrical sub-network S4 via the electrical sub-network S2, or from the electrical sub-network S1 to the electrical sub-network S4 via the electrical sub-network S3, by multi-hop routing.

In the same manner as FIG. 16, FIG. 17 shows an example in which the four electrical sub-networks S1 to S4 in FIG. 25 are connected. Diagonal optical paths are established between the electrical sub-networks S1 and S4, and between the electrical sub-networks S2 and S3.

In FIG. 16 and FIG. 17, the electrical border nodes 11A, 12A, 21A, 22A, 30A, 32A and 40A in the electrical sub-networks S1 to S4 have two electrical packet transmission/reception ports connected to the photonic core network C. How the two electrical packet transmission/reception ports provided in the respective electrical border nodes 11A, 12A, 21A, 22A, 30A, 32A and 40A should be directly connected by optical paths is determined by the traffic quantity between the electrical sub-networks S1 to S4. FIG. 16 is favorable when the traffic quantity over the diagonal paths is small, and conversely FIG. 17 is favorable when such traffic is high.

In the same manner as the first conventional example, if in this second conventional example the optical paths are established without taking the traffic quantity into consideration, then for example electrical sub-networks which exchange a high quantity of traffic may not be directly connected by an optical path, making it necessary to transfer packets by multi-hop routing, which causes a problem of congestion of the optical paths.

Traffic quantity varies temporally, and as such even once the optical paths are established, it can be necessary to dynamically reconfigure the optical paths according to the conditions. Requiring a network administrator to manually reconfigure the optical paths in this manner according to variations in traffic increases the amount of work required for maintenance, which is undesirable.

SUMMARY OF THE INVENTION

The present invention takes the above factors into consideration, with an object of providing an optical/electrical path integrated network, a node, a program and a recording medium which allows the efficient use of network resources without requiring the intervention of the network administrator, by automatically performing the establishment and release of optimal optical paths according to the traffic quantity between electrical sub-networks.

All of the electrical sub-networks are connected by optical paths so as to be connected, by either a single hop or multiple hops. Consequently, all of the electrical sub-networks are connected by electrical virtual Label Switched Paths (LSPs). The LSPs are established over the optical paths. When electrical sub-networks are connected by multiple-hop routing, the LSPs which connect these electrical sub-networks traverse a plurality of optical paths.

The electrical border node in an electrical sub-network measures the flow of packets from its own electrical sub-network which are destined for other electrical sub-networks. This measurement can be obtained by measuring the number of packets and the number of bytes transferred over the LSPs which connect these electrical sub-networks. The bit rate can be calculated by normalizing these measured values over time.

The electrical border node notifies a photonic border node of the traffic quantity measured for each LSP. Upon receiving this information, the photonic border node then notifies another photonic border node. By mutually exchanging this traffic information, the photonic border nodes can obtain information relating to the traffic quantity between the electrical sub-networks.

By thus exchanging the results of measuring traffic quantity, each photonic border node can know in an autonomous manner which electrical sub-networks are exchanging a large amount of traffic. It is possible for the photonic border nodes to establish or release optical paths in an autonomous manner, based on these pieces of information.

If information relating to the optical paths which have been established or released is then exchanged between the photonic border nodes, and the photonic border nodes notify the electrical border nodes of this information, the electrical border nodes can become aware that the topology of the electrical sub-networks has changed, and change the paths of the LSPs accordingly. FIG. 4 conceptually shows the dynamic establishment or release of optical paths according to traffic quantity.

In other words, a first aspect of the present invention is an optical/electrical path integrated network, which comprises a plurality of electrical sub-networks comprising nodes which perform routing based on packet header information, and a photonic core network comprising nodes which are interconnected by optical paths, wherein electrical border nodes and photonic border nodes are interconnected between the photonic core network and the plurality of electrical sub-networks, respectively, by optical paths.

Here, a characteristic of the present invention is that the electrical border nodes comprise a measuring device which measures the traffic quantity between its own electrical sub-network and other electrical sub-networks, and a device which notifies a photonic border node about the information relating to traffic quantity obtained by the measurement results from the measuring device, and that the photonic border nodes comprise a exchanging device which exchanges with other photonic border nodes the information relating to traffic quantity received from the electrical border nodes, a device which gathers information relating to traffic quantity between the plurality of electrical sub-networks based on the plurality of pieces of information relating to traffic quantity which are exchanged by the exchanging device, and a gathering device which sets up the connection mode between the electrical sub-networks, based on the information relating to traffic quantity gathered by the gathering device.

The device which sets up the connection mode preferably comprises a device which sets the distance between electrical sub-networks, between which traffic is generated, in inverse proportion to the quantity of traffic.

In addition, the photonic border nodes preferably comprise an exchanging device which when the connection mode between the electrical sub-networks has been changed by the device which sets up the connection mode, exchanges optical path establishment change information containing information detailing this change with other photonic border nodes, a gathering device which gathers network topology information based on a plurality of pieces of the optical path establishment change information exchanged by this exchanging device, and a device which notifies the electrical border nodes about the network topology information gathered by this gathering device.

A second aspect of the present invention is an electrical border node for use with the optical/electrical path integrated network, which comprises a plurality of electrical sub-networks, comprising nodes which perform routing based on packet header information, and a photonic core network comprising nodes which are interconnected by optical paths, wherein the electrical border nodes and the photonic border nodes are interconnected between the photonic core network and the plurality of electrical sub-networks, respectively, by optical paths.

Here, a characteristic of the present invention is that it comprises a device which measures its own traffic quantity between the electrical sub-network and other electrical sub-networks, and a device which notifies the photonic border nodes about information relating to traffic quantity, which is based on the results of the measuring device.

A third aspect of the present invention is an electrical border node for use with the optical/electrical path integrated network which comprises a plurality of electrical sub-networks comprising nodes which perform routing based on packet header information, and a photonic core network comprising nodes which are interconnected by optical paths, wherein the electrical border nodes and the photonic border nodes are interconnected between the photonic core network and the plurality of electrical sub-networks, respectively, by optical paths, and the electrical border node comprises a device which measures the traffic quantity between its own electrical sub-network and other electrical sub-networks, and a device which notifies the photonic border nodes about the information relating to traffic quantity which is based on the results obtained by the measuring device.

Here, a characteristic of the present invention is that it comprises an exchanging device which exchanges the information relating to traffic quantity received from the electrical border nodes with other photonic border nodes, a gathering device which gathers information relating to the traffic quantity between the plurality of electrical sub-networks based on a plurality of the pieces of information relating to traffic quantity exchanged by this exchanging device, and a device which sets up the connection mode between the electrical sub-networks based on the information relating to traffic quantity gathered by the gathering device.

The device which sets up the connection mode preferably comprises a device for setting the distance between electrical sub-networks between which traffic is generated, in inverse proportion to the quantity of traffic.

In addition, it preferably comprises an exchanging device which when the connection mode between the electrical sub-networks has been changed by the device which sets up the connection mode, exchanges optical path establishment change information containing information detailing this change with other photonic border nodes, a device which gathers network topology information based on a plurality of pieces of the optical path establishment change information exchanged by this exchanging device, and a device which notifies the electrical border nodes about the network topology information gathered by the gathering device.

A fourth aspect of the present invention is a program, which by its installation on an information processing apparatus enables the information processing apparatus to realize the functions required of an apparatus which controls the electrical border node for use with the optical/electrical path integrated network which comprises a plurality of electrical sub-networks comprising nodes which perform routing based on packet header information and a photonic core network comprising nodes which are interconnected by optical paths, wherein the electrical border nodes and the photonic border nodes are interconnected between the photonic core network and the plurality of electrical sub-networks, respectively, by optical paths.

Here, the program of the present invention realizes a measuring function which measures the traffic quantity between its own electrical sub-network and other electrical sub-networks, and a function which notifies the photonic border nodes about this information relating to traffic quantity which is based on the measurement results of this measuring function.

Alternatively, the fourth aspect of the present invention is a program which by its installation on an information processing apparatus enables the information processing apparatus to realize the functions required of an apparatus which controls an electrical border node for use with the optical/electrical path integrated network which comprises a plurality of electrical sub-networks comprising nodes which perform routing based on packet header information and a photonic core network comprising nodes which are interconnected by optical paths, in which the electrical border nodes and the photonic border nodes are interconnected between the photonic core network and the plurality of electrical sub-networks, respectively, by optical paths, wherein the electrical border nodes comprise a function which measures the traffic quantity between its own electrical sub-network and other electrical sub-networks, and a function which notifies the photonic border nodes about the information relating to traffic quantity which is based on the measurement results of the measuring function.

Here, the program of the present invention realizes an exchanging function which exchanges the information relating to traffic received from the electrical border nodes with other photonic border nodes, a gathering function which gathers information relating to traffic quantity between the plurality of electrical sub-networks based on the plurality of pieces of information relating to traffic quantity which are exchanged by this exchanging function, and a function which sets up the connection mode between the electrical sub-networks based on the information relating to traffic gathered by this gathering function.

The function which sets up the connection mode preferably realizes a function which sets the distance between electrical sub-networks between which traffic is generated, in inverse proportion to the traffic quantity.

In addition, the program of the present invention preferably realizes an exchanging function which when the connection mode between the electrical sub-networks has been changed by the function which sets up the connection mode, exchanges optical path establishment change information containing information detailing the change with other photonic border nodes, a gathering function which gathers network topology information based on a plurality of pieces of the optical path establishment and release information exchanged by this exchanging function, and a function which notifies the electrical border nodes about the network topology information gathered by this gathering device.

A fifth aspect of the present invention is a storage medium on which the program of the present invention is stored, which is capable of being read by the aforementioned information processing device. By storing the program of the present invention on the storage medium of the present invention, the information processing apparatus can install the program of the present invention using this storage medium. Alternatively, the program of the present invention may be installed on the information processing apparatus over a network, from a server on which the program of the present invention is stored.

Accordingly, by automatically performing the establishment or release of optimal optical paths according the traffic quantity between the electrical sub-networks using an information processing apparatus such as a computer, an optical/electrical path integrated network and a node which can make effective use of network resources without requiring the intervention of the network administrator can be realized.

A main characteristic of the present invention is in an algorithm used to automatically establish or release optimal optical paths according to the traffic quantity between electrical sub-networks.

First, in a connection phase, the electrical sub-networks exchanging high actual quantity of traffic are directly connected by optical paths. Then in a capacity verification phase, virtual routing is performed, and electrical sub-networks between which congestion is likely to occur are sought and directly connected by optical paths. In addition, according to the actual optical path usage, for an optical path with the usage ratio equal to or greater than a threshold value $\alpha$, additional optical paths are established so that the electrical paths which go through this optical path can travel between the electrical sub-networks via a single hop. Furthermore, according to the actual optical path usage, for an optical path with the usage ratio equal to or below a threshold value $\beta$, the electrical paths established on this optical paths are virtually bypassed to other optical paths, and if as a result there is determined to be no possibility of congestion occurring, the optical path is released.

By automatically establishing or releasing optimal optical paths according to the traffic quantity between electrical sub-networks using such an algorithm, it is possible to make effective use of network resources without requiring the intervention of the network administrator.

In other words, a sixth aspect of the present invention is an optical/electrical path integrated network comprising electrical sub-networks which exchange data in packet units and a photonic core network which interconnects these electrical sub-networks, wherein the photonic core network comprises photonic border nodes and a photonic core node, and the electrical sub-networks comprise electrical border nodes and electrical core nodes, and the electrical border nodes and the photonic border nodes provided in the electrical sub-networks and the photonic core network which are contiguous are directly connected.

Here, a characteristic of the present invention is that the photonic border nodes comprise a storage device which stores topology information for the photonic core network, a calculating device which calculates the shortest path between photonic border nodes based on the topology information stored in the storage device, and a device which establishes optical paths over this shortest distance calculated by the calculating device, and that the electrical border nodes comprise a storage device which stores the topology information for the network which is constructed from the optical paths established over the photonic core network, a calculating device which calculates the shortest path between electrical border nodes based on the topology information stored in the storage device, and a device which establishes electrical paths over this shortest path calculated by this calculating device, and that a detecting device which detects the two electrical sub-networks which exchange the highest quantity of traffic and are not yet directly connected by an optical path is provided, and the device which establishes the optical paths comprises an optical path establishment device which establishes optical paths between the two electrical sub-networks detected by the detecting device.

In addition, the device which establishes the electrical paths preferably comprises an electrical path establishment device which establishes electrical paths over the shortest path between the electrical sub-networks on the optical paths established by the optical path establishment device, and further comprises a device which performs virtual routing over the electrical paths established by this electrical path establishment device, a congested optical path detection device which detects congested locations on the optical paths based on the results of the virtual routing by the device which performs virtual routing, and a new optical path establishing device, which when a congested optical path as detected by this congested optical path detection device does not directly connect the electrical sub-networks which are causing the congestion, newly establishes an optical path which directly connects these electrical sub-networks.

Furthermore, it preferably comprises a determining device which determines whether or not the usage ratio of the optical paths established by either the optical path establishment device or the new optical path establishment device is equal to or greater than a threshold value $\alpha$, and further comprises a multi-hop electrical path detection device which detects those electrical paths which do not directly connect electrical sub-networks which travel optical paths which have the usage ratio equal to or greater than the threshold value $\alpha$ based on the results of the determining device, a selection device which selects the electrical path which carries the highest traffic quantity from the electrical paths detected by this multi-hop electrical path detection device, and an optical path adding device which establishes an optical path so that the electrical path selected by this selection device directly connects the electrical sub-networks.

Furthermore, it is also preferable to comprise a determining device which determines whether or not the usage ratio of the optical paths established by either the optical path establishment device or the new optical path establishment device or the optical path adding device is equal to or below a threshold value $\beta$, and to further comprise a bypassing device which virtually bypasses the electrical paths established over the optical paths which are determined by this determining device to have the usage ratio equal to or below the threshold value $\beta$ to other optical paths, a congested optical path detection device which detects congested locations on the optical paths after this virtual bypassing is performed by the bypassing device, and a device which actually releases the optical paths which have the usage ratio equal to or below the threshold value β after the virtual bypassing has actually been performed by the bypassing device when congested optical paths are not detected by the congested optical path detection device.

A seventh aspect of the present invention is a node for use in the optical/electrical path integrated network of the present invention, comprising at least one of a storage device which stores topology information for the photonic core network, a calculating device which calculates the shortest path between photonic border nodes based on the topology information stored in the storage device, a device which establishes an optical path over this shortest path calculated by the calculating device, a storage device which stores the topology information for the network constructed from the optical paths established over the photonic core network, a calculating device which calculates a shortest path between electrical border nodes based on the topology information stored in the storage device, a device which establishes electrical paths over this shortest path calculated by this calculating device, and a detecting device which detects the two electrical sub-networks which exchange the highest quantity of traffic and are not yet directly connected by an optical path, wherein the device which establishes the optical paths comprises an optical path establishment device which establishes optical paths between the two electrical sub-networks detected by the detecting device.

In addition, the device which establishes the electrical paths preferably comprises an electrical path establishment device which establishes electrical paths over the shortest path between the electrical sub-networks on the optical paths established by the optical path establishment device, and further comprises a device which performs virtual routing over the electrical paths established by this electrical path establishment device, a congested optical path detection device which detects congested locations on the optical paths based on the results of the device which performs virtual routing, and a new optical path establishment device, which when a congested optical path as detected by this congested optical path detection device does not directly connect the electrical sub-networks which are causing the congestion, newly establishes an optical path which directly connects these electrical sub-networks.

Furthermore, it preferably comprises a determining device which determines whether or not the usage ratio of the optical paths established by either the optical path establishment device or the new optical path establishment device is equal to or greater than a threshold value α, and further comprises a multi-hop electrical path detection device which detects those electrical paths which do not directly connect between electrical sub-networks which travel optical paths which have the usage ratio equal to or greater than the threshold value α based on the results of the determining device, a selection device which selects the electrical path which carries the highest traffic quantity from the electrical paths detected by this multi-hop electrical path detection device, and an optical path adding device which establishes an optical path so that the electrical path selected by this selection device directly connects the electrical sub-networks.

Furthermore, it is also preferable to comprise a determining device which determines whether or not the usage ratio of the optical paths established by either the optical path establishment device or the new optical path establishment device is equal to or below a threshold value β, and further comprises a bypassing device which virtually bypasses the electrical paths established over the optical paths which are determined by this determining device to have the usage ratio equal to or below the threshold value β to other optical paths, a congested optical path detection device which detects congested locations on the optical paths after this virtual bypassing is performed by the bypassing device, and a device which actually releases the optical paths which have the usage ratio equal to or below the threshold value β after the virtual bypassing has actually been performed by the bypassing device when congested optical paths are not detected by the congested optical path detection device.

An eighth aspect of the present invention is a program which by its installation on an information processing apparatus enables the information processing apparatus to realize the functions required of an apparatus which controls the node for use in the optical/electrical path integrated network of the present invention, characterized in realizing at least one of a storage function which stores the topology information for the photonic core network, a calculating function which calculates the shortest path between photonic border nodes based on the topology information stored by the storage function, a calculating function which establishes an optical path over this shortest path calculated by the calculating function, a storage function which stores the topology information for the network constructed from the optical paths established over the photonic core network, a function which calculates the shortest path between electrical border nodes based on the topology information stored by the storage function, a function which establishes an electrical path over this shortest path calculated by this calculating function, and a detecting function which detects the two electrical sub-networks which exchange the highest quantity of traffic between the electrical sub-networks and are not yet directly connected by an optical path, wherein an optical path establishment function establishes optical paths between the two electrical sub-networks detected by the detecting function is realized.

In addition, the function which establishes the electrical paths preferably realizes an electrical path establishment function which establishes an electrical path over the shortest path between the electrical sub-networks on the optical paths established by the optical path establishment function, and further realizes a function which performs virtual routing over the electrical path established by this electrical path establishment function, a congested optical path detection function which detects the congested locations on the optical paths based on the results of the virtual routing function, and a new optical path establishment function, which when a congested optical path as detected by this congested optical path detection function does not directly connect the electrical sub-networks which are causing the congestion, newly establishes an optical path which directly connects these electrical sub-networks.

Furthermore, it preferably realizes a determining function which determines whether or not the usage ratio of the optical paths established by either the optical path establishment function or the new optical path establishment function is equal to or greater than a threshold value α, and further realizes a multi-hop electrical path detection function which detects those electrical paths which do not directly connect between electrical sub-networks which travel optical paths which have the usage ratio equal to or greater than the threshold value α based on the results of the determining device, a function which selects the electrical path which carries the highest traffic quantity from the electrical paths detected by this multi-hop electrical path detection function, and an optical path adding function which establishes an optical path so that the electrical path selected by this selection function directly connects the electrical sub-networks.

Furthermore, it is also preferable to realize a determining function which determines whether or not the usage ratio of the optical paths established by either the optical path establishment function or the new optical path establishment function or the optical path adding function is equal to or below a threshold value β, and to further realize a bypassing function which virtually bypasses the electrical paths established over the optical paths which are determined by this determining function to have the usage ratio equal to or below the threshold value β to other optical paths based on the results from the determining function, a congested optical path detection function which detects congested locations on the optical paths after this virtual bypassing is performed by the bypassing function, and a function which actually releases the optical paths which have the usage ratio equal to or below the threshold value β after the virtual bypassing has actually been performed by the bypassing function when congested optical paths are not detected by the congested optical path detection function.

A ninth aspect of the present invention is a storage medium on which the program of the present invention is stored, which is capable of being read by the aforementioned information processing device. By storing the program of the present invention on the storage medium of the present invention, the information processing apparatus can install the program of the present invention using this storage medium. Alternatively, the program of the present invention may be installed on the information processing apparatus over a network, from a server on which the program of the present invention is stored.

Accordingly, by automatically performing the establishment or release of optimal optical paths according the traffic quantity between the electrical sub-networks using an information processing apparatus such as a computer, an optical/electrical path integrated network and a node which can make effective use of network resources without requiring the intervention of the network administrator can be realized.

A tenth aspect of the present invention is a path establishment method for use with the optical/electrical path integrated network of the present invention, characterized in that the photonic border nodes store the topology information for the photonic core network, calculate the shortest path between the photonic border nodes based on this stored topology information, and establish optical paths over this calculated shortest path, and the electrical border nodes store the topology information for the network constructed from the optical paths established over the photonic core network, calculate the shortest path between electrical border nodes based on the stored topology information, establish electrical paths over this calculated shortest path, detect the two electrical sub-networks which exchange the highest quantity of traffic and are not yet directly connected by an optical path, and establish optical paths between the two electrical sub-networks detected.

In addition, it is preferable that electrical paths are established over the shortest paths between the electrical sub-networks on the established optical paths, virtual routing is performed over these established electrical paths, congested locations on the optical paths are detected based on the results of this virtual routing, and that when a congested optical path as shown by the detection results does not directly connect the electrical sub-networks which are causing the congestion, an optical path which directly connects these electrical sub-networks is newly established.

Furthermore, it is preferable that a determination is made as to whether the usage ratio of the established optical paths is equal to or above a threshold value α, that electrical paths which do not directly connect between electrical sub-networks and which travel optical paths which have the usage ratio equal to or greater than the threshold value α are detected based on the determination results, that the electrical path with the highest traffic quantity is selected from these detected electrical paths, and that an optical path is then established so that this selected electrical path directly connects the electrical sub-networks.

Furthermore, it is preferable that a determination is made as to whether the usage ratio of the established optical paths is equal to or below a threshold value β, that electrical paths established on optical paths which are shown to have the usage ratio equal to or below the threshold value β are virtually bypassed to other optical paths based on the determination results, that congested locations upon the optical paths are detected after this virtual bypassing has occurred, and that when congested optical paths are not detected based on these detection results, the optical paths which after actually performing this virtual bypassing have the usage ratio equal to or below the threshold value β are actually released.

As described above, according to the present invention, by automatically establishing or releasing optimal optical paths according to the traffic quantity between electrical sub-networks, it is possible to make effective use of network resources, without requiring the intervention of the network administrator.

BRIEF DESCRIPTION OF THE DRAWINGS

FIG. 18 is a diagram showing a traffic matrix.

FIG. 19 is a diagram showing an E-LSP hop count matrix.

DETAILED DESCRIPTION OF THE PREFERRED EMBODIMENTS

Embodiment 1

Figure 1:
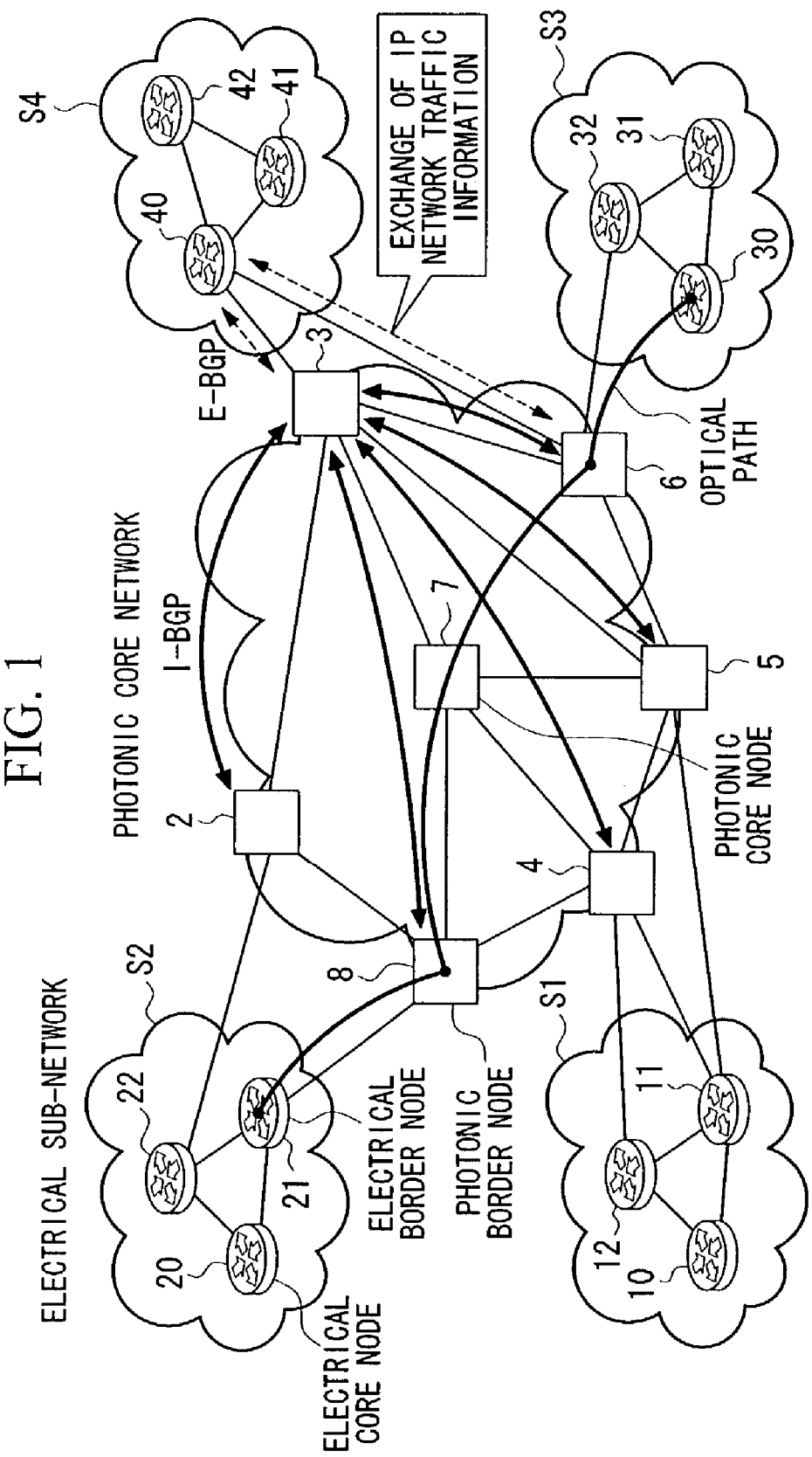
FIG. 1 is a diagram showing an optical/electrical path integrated network of an embodiment of the present invention.
Figure 2:
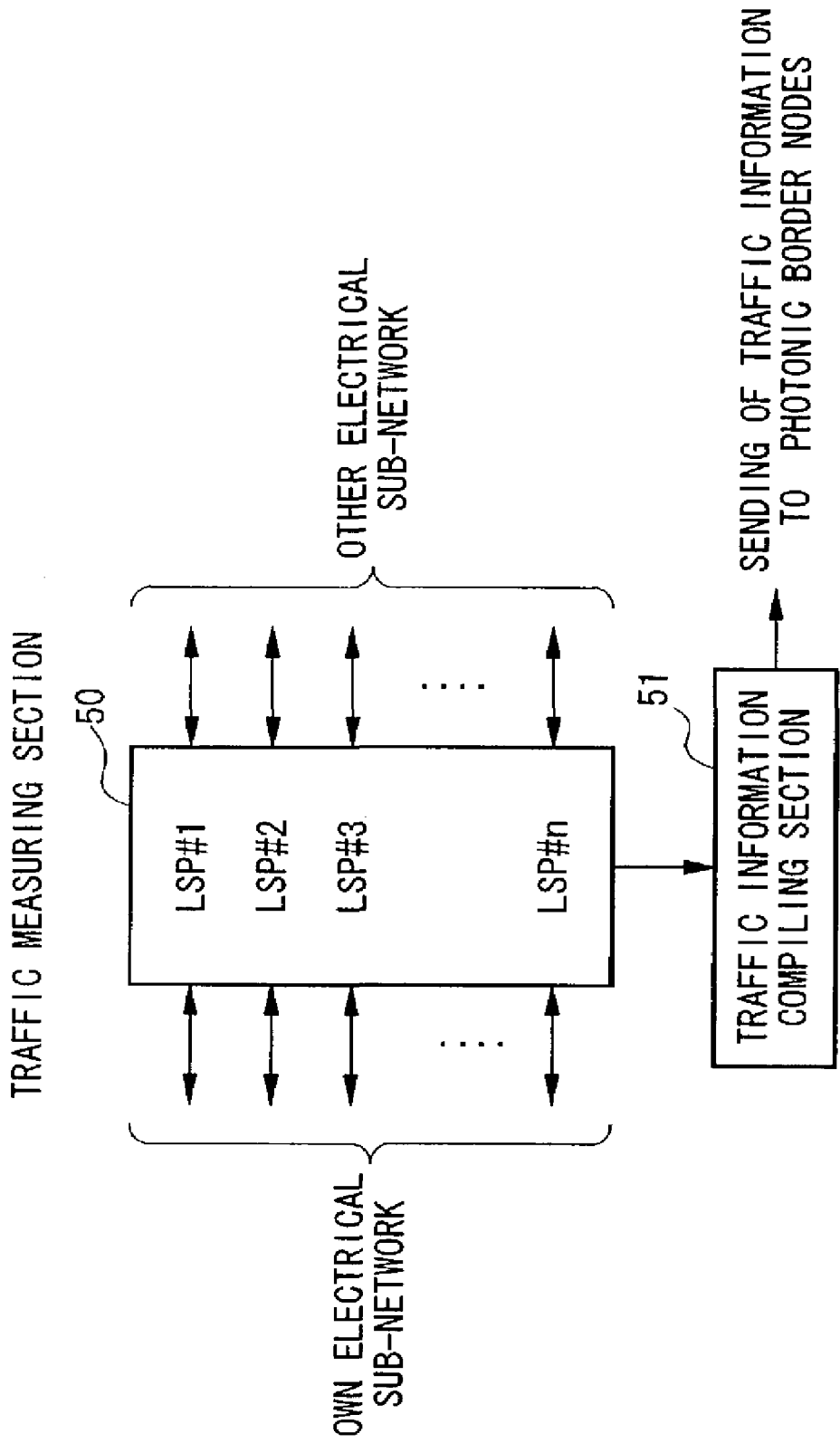
FIG. 2 is a block diagram showing an electrical border node of the present embodiment.
Figure 3:
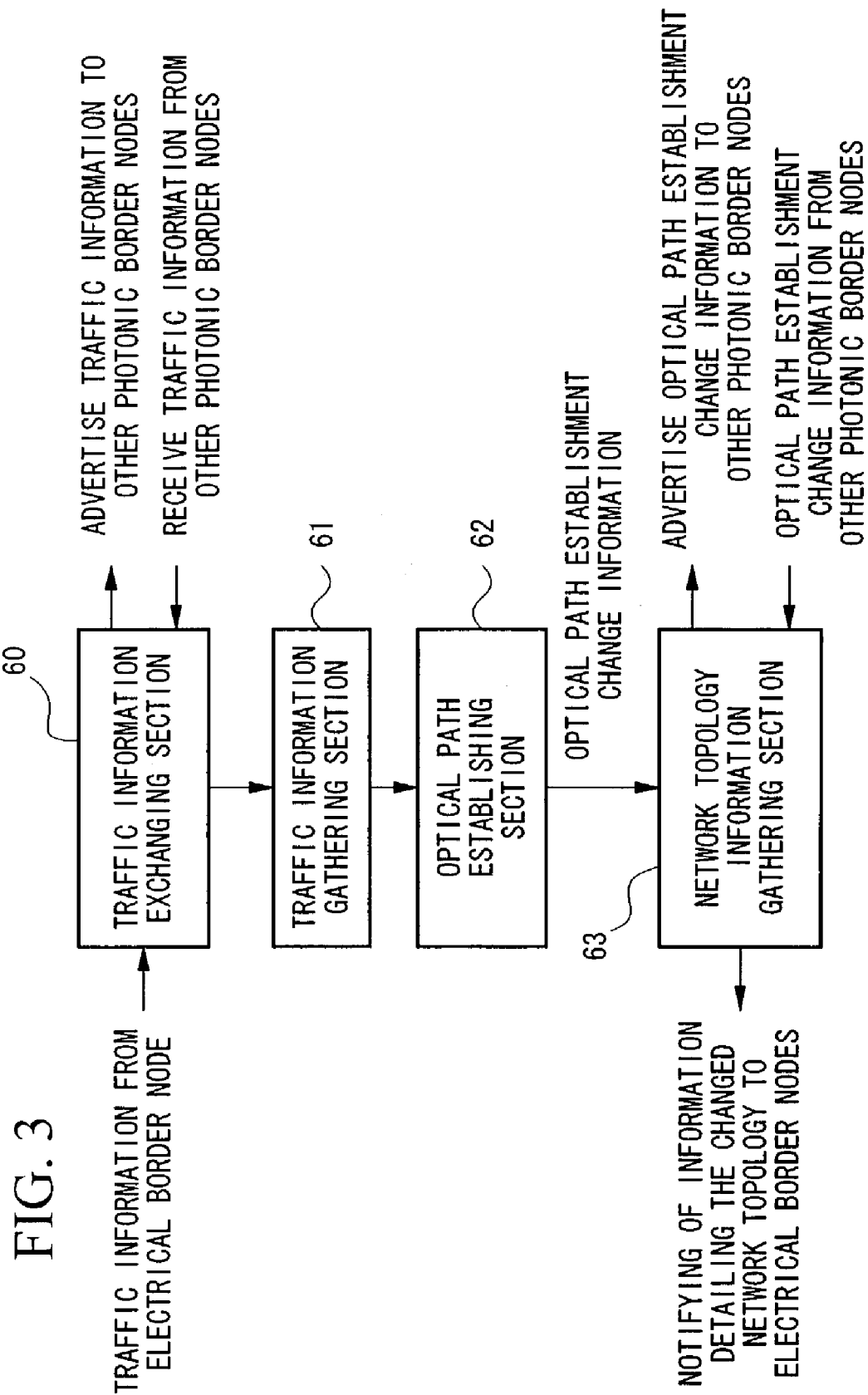
FIG. 3 is a block diagram showing a photonic border node of the present embodiment.
Figure 4:
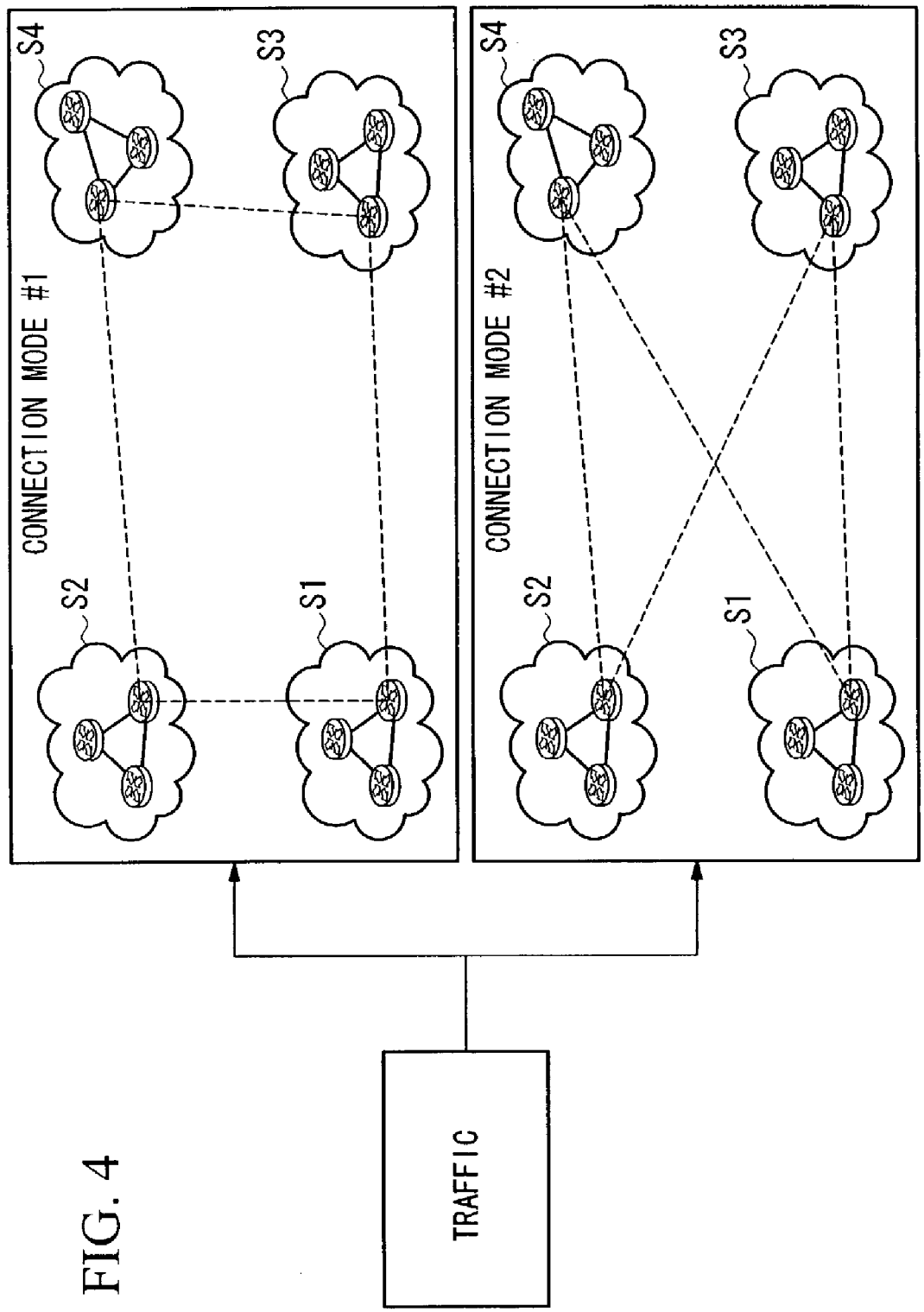
FIG. 4 is a diagram showing a connection mode #1 and a connection mode #2 of the present embodiment.
Figure 5:
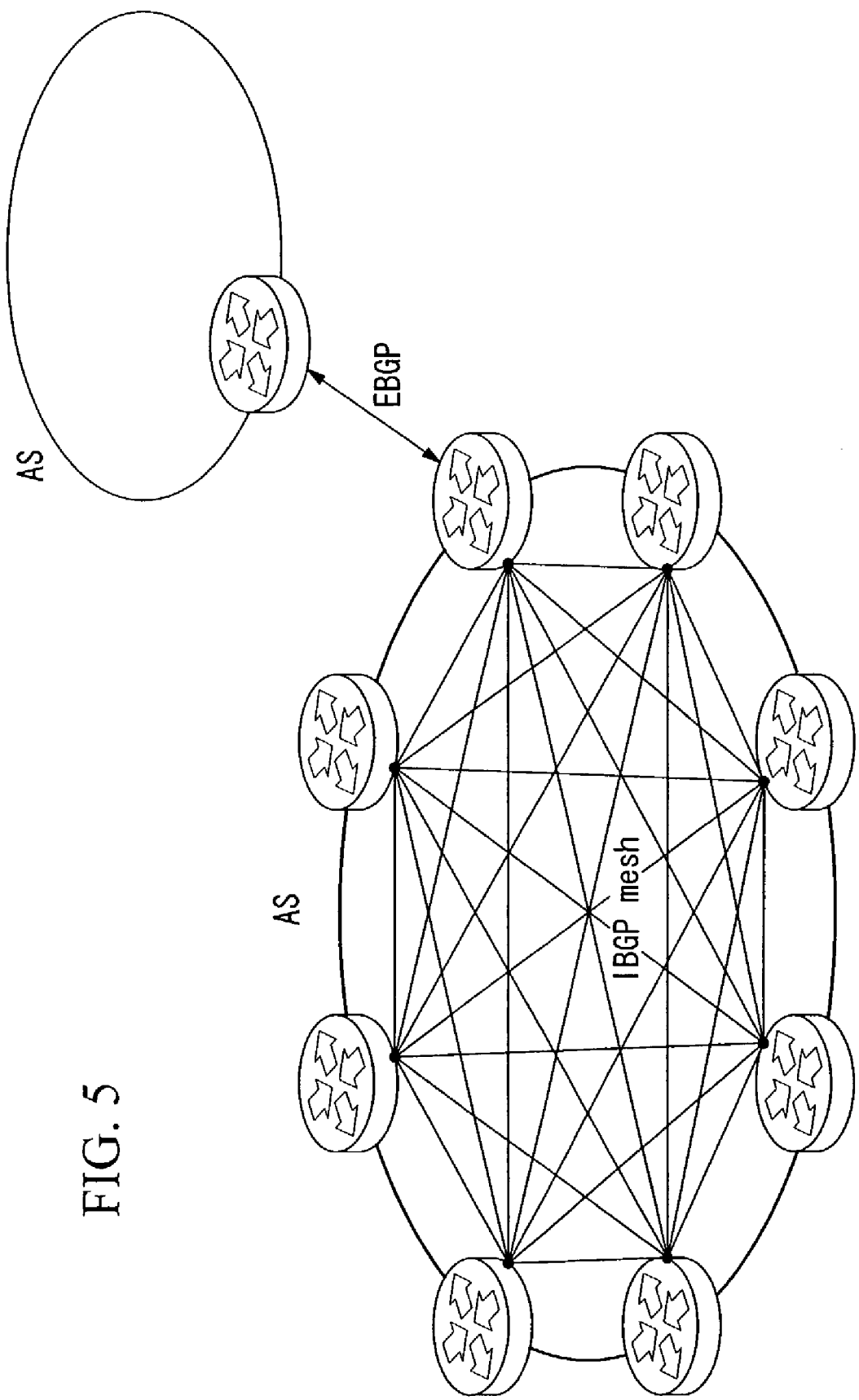
FIG. 5 is a diagram describing a BGP-4 protocol used in the present embodiment.
Figure 6:
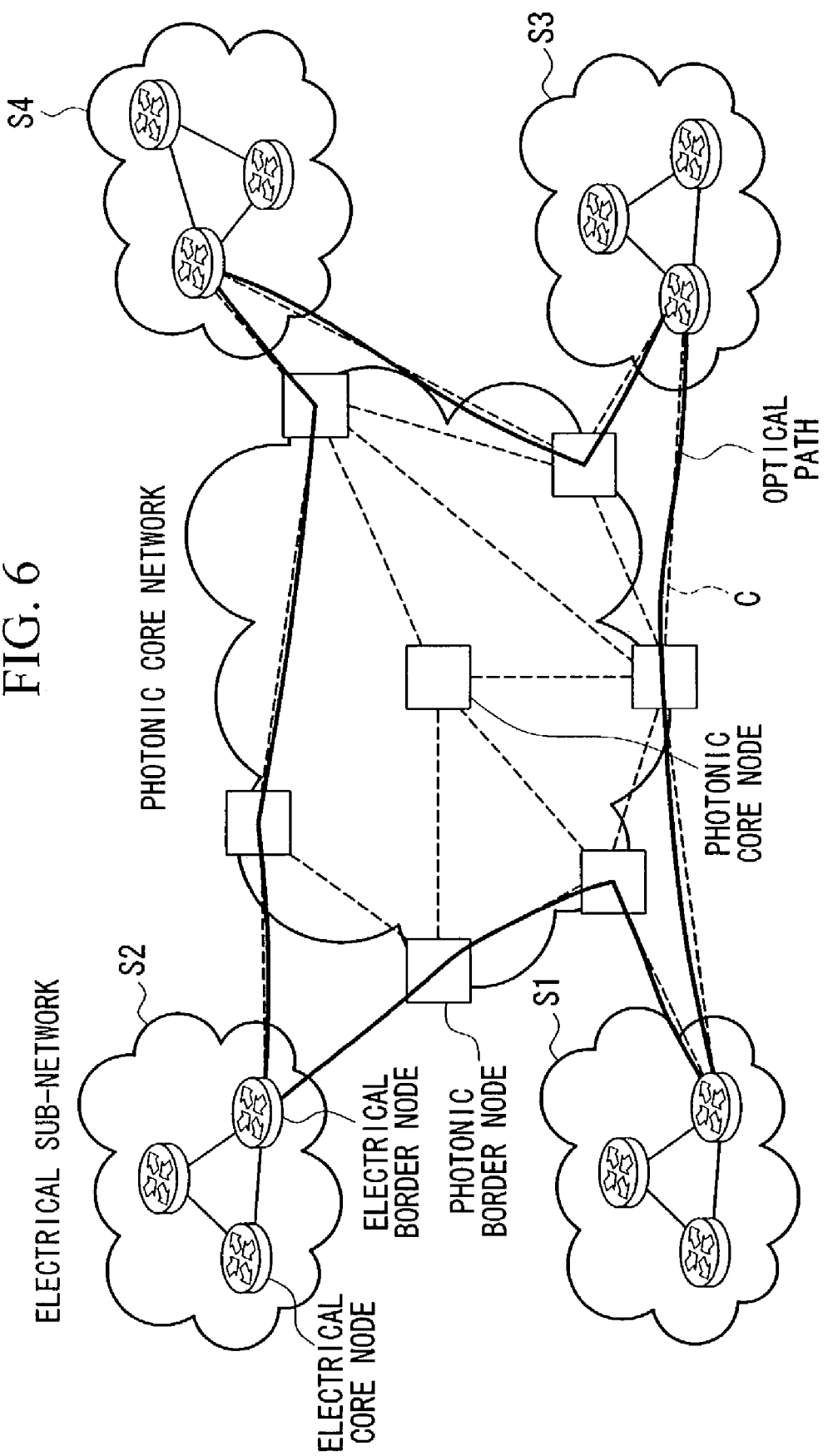
FIG. 6 is a diagram showing the relationship between the photonic core network and the electrical sub-networks.
Figure 7:
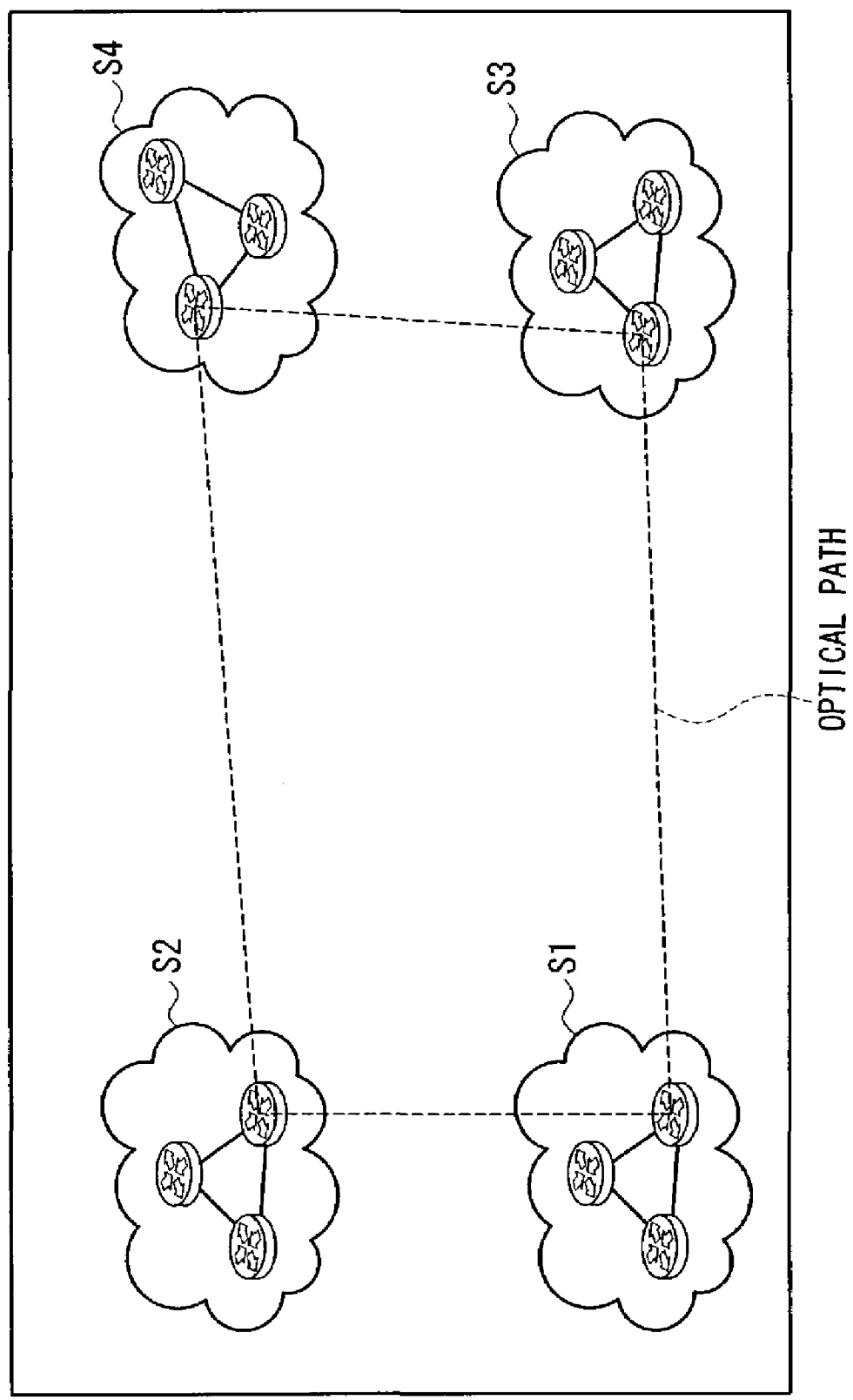
FIG. 7 is a view showing only the electrical sub-networks.
Figure 8:
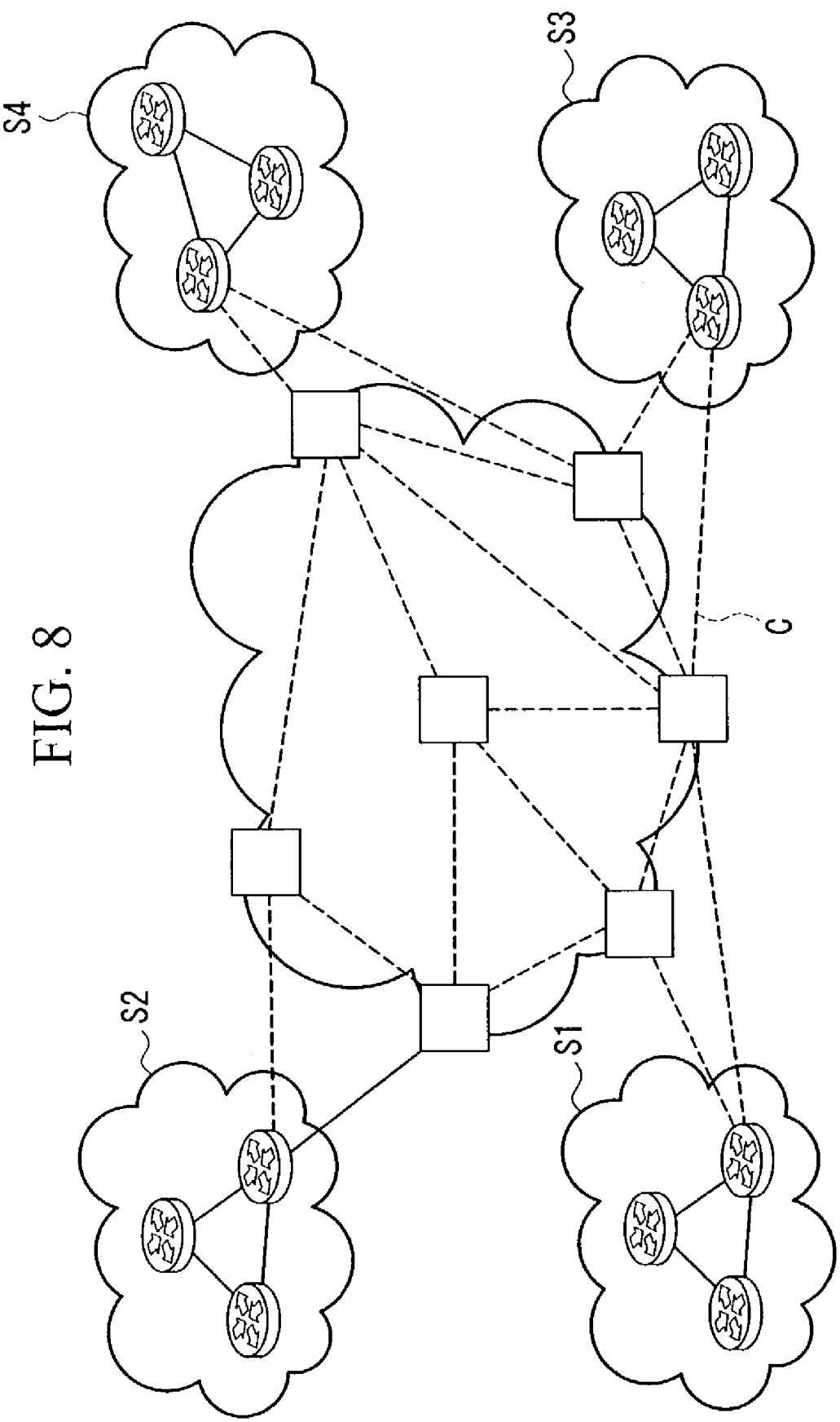
FIG. 8 is a combined view of the electrical sub-networks and the photonic core network.
Figure 9:
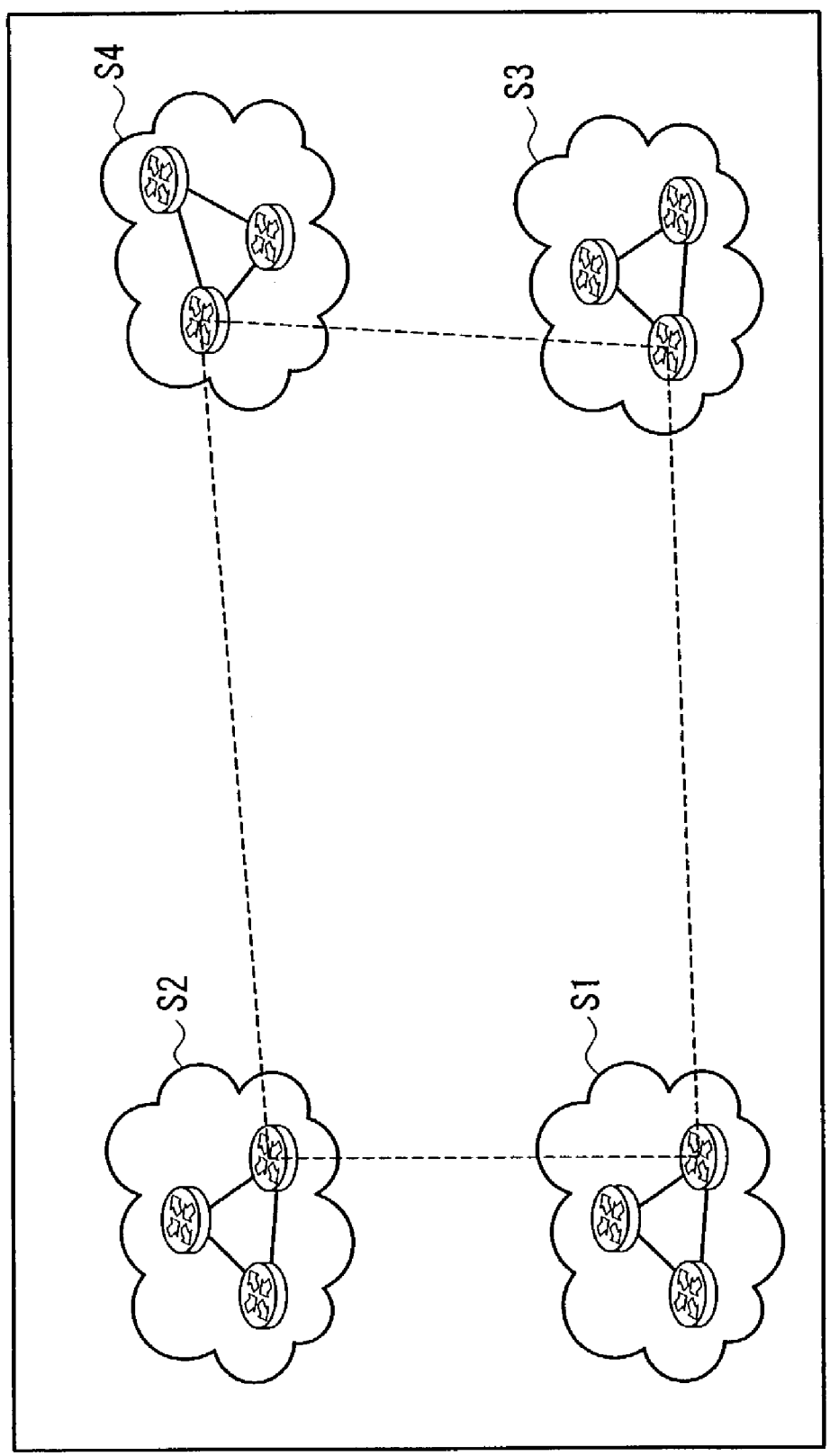
FIG. 9 is a diagram showing an example of a connection mode of the electrical sub-networks.
Figure 10:
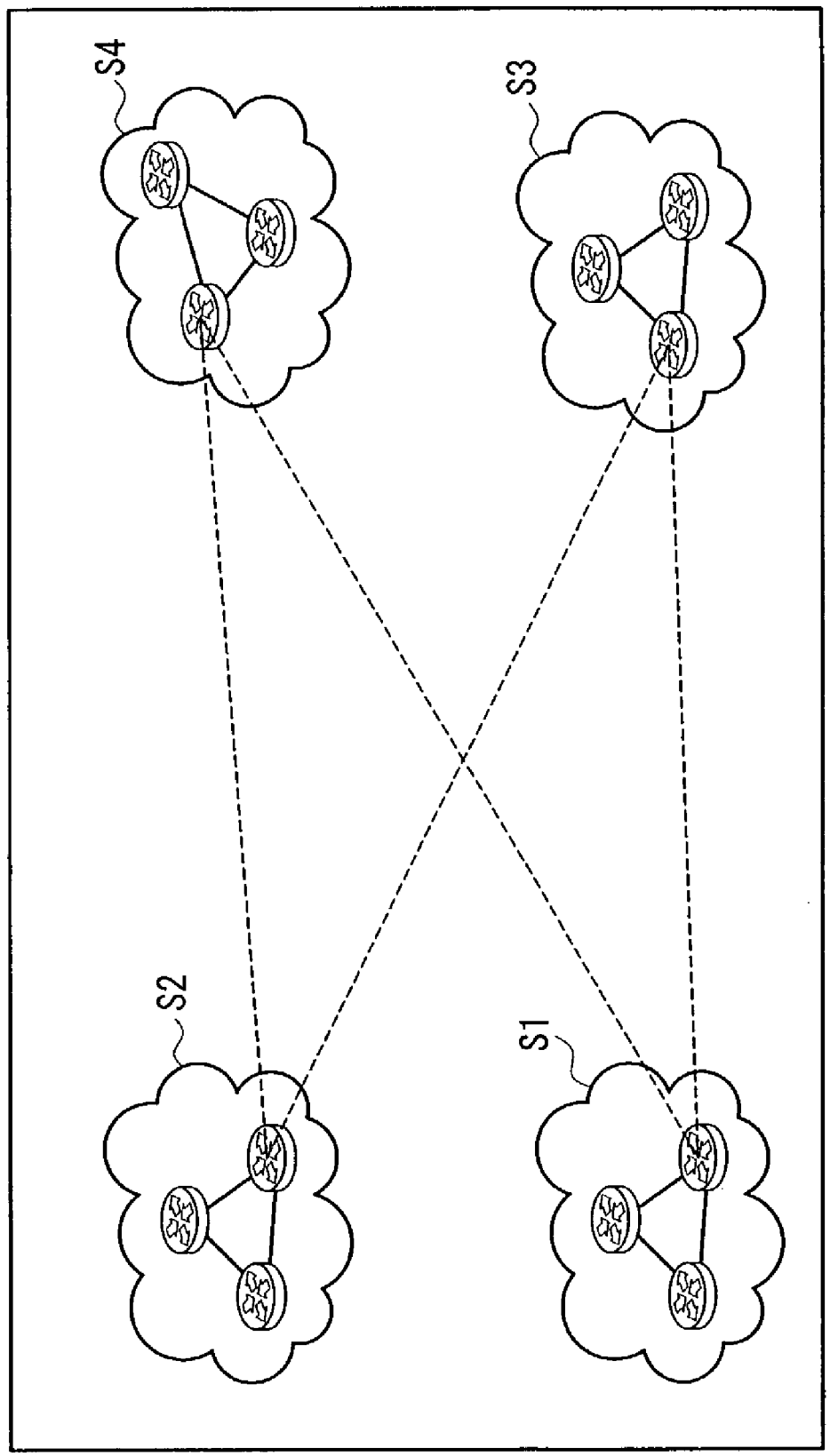
FIG. 10 is a diagram showing an example of a connection mode of the electrical sub-networks.

As follows is a description of an optical/electrical path integrated network of an embodiment of the present invention, referring to FIG. 1 through FIG. 5. FIG. 1 is a diagram showing an optical/electrical path integrated network of a first embodiment of the present invention. FIG. 2 is a block diagram showing an electrical border node of the first embodiment of the present invention. FIG. 3 is a block diagram showing a photonic border node of the first embodiment. FIG. 4 is a diagram showing a connection mode #1 and a connection mode #2 of the first embodiment. FIG. 5 is a diagram describing the BGP-4 protocol used in the first embodiment.

As shown in FIG. 1, the first embodiment of the present invention is an optical/electrical path integrated network comprising a plurality of electrical sub-networks S1 to S4 which comprise nodes which perform routing based on packet header information and a photonic core network C which comprises nodes which are interconnected by optical paths, wherein the electrical border nodes 11, 12, 21, 22, 30, 32, 40 and the photonic border nodes 1, 2, 3, 4, 5, 6 are interconnected between the photonic core network C and the electrical sub-networks S1 to S4 by optical paths.

Here, a characteristic of the present invention is that as shown in FIG. 2, the electrical border nodes 11, 12, 21, 22, 30, 32, 40 comprise a traffic measuring section 50 which measures the traffic quantity between its own electrical sub-network to which each electrical border node belongs and other electrical sub-networks, and a traffic information compiling section 51 which notifies the photonic border nodes 1, 2, 3, 4, 5, 6 about the information relating to traffic quantity based on the measurement results of the traffic measuring section 50, and that as shown in FIG. 3 the photonic border nodes 1, 2, 3, 4, 5, 6 comprise a traffic information exchanging section 60 which exchanges the information relating to traffic quantity received from the electrical border nodes 11, 12, 21, 22, 30, 32, 40 with other photonic border nodes, a traffic information gathering section 61 which gathers information relating to the traffic quantity between the electrical sub-networks S1 to S4 based on the plurality of pieces of information relating to traffic quantity which are exchanged by the traffic information exchanging section 60, and an optical path establishing section 62 which establishes the connection mode between the electrical sub-networks S1 to S4 based on the information relating to traffic quantity gathered by the traffic information gathering section 61.

As shown in FIG. 4, the optical path establishing section 62 establishes the distance between electrical sub-networks between which traffic is generated, in inverse proportion to the quantity of traffic. In the example shown in FIG. 4, when the traffic between the electrical sub-networks S1 to S4 is approximately even, the connection mode #1 is set up, and when there is a large quantity of traffic between the electrical sub-networks S1 and S4, and between the electrical sub-networks S2 and S3, the connection mode #2 is set up.

Therefore, when there is a large quantity of traffic between the electrical sub-networks S1 and S4, and between the electrical sub-networks S2 and S3, direct connections are established between the electrical sub-networks S1 to S4, thereby preventing congestion from occurring.

In addition, the photonic border nodes 1, 2, 3, 4, 5, 6 comprise a network topology information gathering section 63 which when the connection mode between the electrical sub-networks S1 to S4 has been changed by the optical path establishing section 62, exchanges optical path establishment change information detailing the changes with other photonic border nodes, and gathers network topology information based on the plurality of pieces of optical path establishment change information which have been exchanged, and notifies the electrical border nodes 11, 12, 21, 22, 30, 32, 40 about this gathered network topology information.

As a result, the electrical border nodes 11, 12, 21, 22, 30, 32, 40 are made aware that the topology of the electrical sub-networks S1 to S4 has changed, and can change the path of an LSP accordingly. The dynamic establishment and release of optical paths based on traffic is outlined in FIG. 4.

A control device for the optical/electrical path integrated network of the present embodiment, or a control device for the electrical border nodes, a control device for the electrical core nodes, a control device for the photonic border nodes, and a control device for the photonic core node, can be realized using a computer, which is an information processing device. In other words, the program of the present embodiment by its installation onto a computer can allow the computer to perform the functions required of an apparatus which controls the electrical border nodes 11, 12, 21, 22, 30, 32, 40 of the present embodiment, and realizes a function corresponding with the traffic measuring section 50 which measures the traffic quantity between the electrical sub-network to which each electrical border node belongs and other electrical sub-networks, and a function corresponding with the traffic information compiling section 51 which notifies the photonic border nodes 1, 2, 3, 4, 5, 6 about the information relating to traffic which is based on the measurement results of the traffic measuring section 50.

In addition, the program of the present embodiment by its installation onto a computer can allow the computer to perform the functions required of an apparatus which controls the photonic border nodes 1, 2, 3, 4, 5, 6 of the present embodiment, and realizes a function corresponding with the traffic information exchanging section 60 which exchanges the information relating to traffic quantity received from the electrical border nodes 11, 12, 21, 22, 30, 32, 40 with other photonic border nodes, a function corresponding with the traffic information gathering section 61 which gathers information relating to the traffic between electrical sub-networks S1 to S4 based on the plurality of pieces of information relating to traffic quantity which are exchanged by the traffic information exchanging section 60, and a function corresponding with the optical path establishing section 62 which establishes the connection mode between the electrical sub-networks S1 to S4 based on the information relating to traffic quantity gathered by the traffic information gathering section 61, and furthermore allows the function corresponding with this optical path establishing section 62 to establish the distance between electrical sub-networks, between which traffic is generated, in inverse proportion to the quantity of traffic; and further realizes a function corresponding with the network topology information gathering section 63 which when the connection mode between the electrical sub-networks S1 to S4 has been changed by the optical path establishing section 62 exchanges optical path establishment change information detailing the changes with other photonic border nodes, and gathers network topology information based on the plurality of pieces of optical path establishment change information which have been exchanged, and notifies the electrical border nodes 11, 12, 21, 22, 30, 32, 40 about this gathered network topology information.

In addition, the control devices for the electrical core nodes and the photonic core node can also be realized using a computer.

Furthermore, by storing the program of the present embodiment on the storage medium of the present invention, the computer can install the program of the present embodiment using this storage medium. Alternatively, the program of the present embodiment may be installed directly on the information processing apparatus over a network, from a server on which the program of the present embodiment is stored.

Accordingly, by automatically performing the establishment or release of optimal optical paths according the traffic quantity between the electrical sub-networks using a computer, an optical/electrical path integrated network and a node which can make effective use of network resources without requiring the intervention of the network administrator can be realized.

The first embodiment is described in more detail below.

An example is used in which the exchange of traffic quantity information between photonic border nodes, and between photonic border nodes and electrical border nodes, is performed using a modified version of a standard Internet protocol.

The BGP-4 protocol is a standard Internet protocol. This protocol is used to exchange path information between autonomous systems (AS). First a session is established between border routers in an autonomous system, and then path information is exchanged. A session established between border routers in different autonomous systems is called an E-BGP (External BGP) session, and a session established between border routers belonging to the same AS is called an I-BGP (Internal BGP) session.

FIG. 5 outlines an I-BGP session and an E-BGP session. In the I-BGP session, the border routers within the same AS are connected in a full mesh configuration. Information about reachable paths is transmitted between autonomous systems using an E-BGP session. The path information transmitted in the E-BGP session is then transmitted to every border router within the same AS using an I-BGP session.

Using this transmission scheme, information on traffic quantity is exchanged between photonic border routers, and between photonic border nodes and electrical border nodes. FIG. 1 outlines the propagation of traffic information in the present embodiment. The traffic information measured at the electrical border nodes 11, 12, 21, 22, 30, 32, 40 is transmitted to the photonic border nodes 1, 2, 3, 4, 5, 6 via an E-BGP session. The photonic border nodes 1, 2, 3, 4, 5, 6 which receive this traffic information then transmit the traffic information to the other photonic border nodes within the photonic core network C via an I-BGP session. Each of the photonic border nodes 1, 2, 3, 4, 5, 6 then gathers traffic information for the LSPs between the electrical sub-networks S1 to S4 based on the received traffic quantity information, and in order to set the distance between electrical sub-networks between which traffic is generated, in inverse proportion to the quantity of traffic, performs the establishment or release of optical paths in an autonomous manner.

Once the photonic border nodes have performed the establishment or release of the optical paths, the information about the optical paths (which electrical sub-networks they connect between) is transmitted using BGP sessions. This information is transmitted to the electrical border nodes via an I-BGP session, and to the photonic border nodes via an E-BGP session.

Furthermore, an example is described in which the exchange of traffic quantity information between photonic border nodes, and between photonic border nodes and electrical border nodes, is performed using a modified version of a standard Internet protocol called OSPF (Open Shortest Path First).

OSPF is a standard Internet protocol. This protocol allows the nodes within an autonomous system to exchange link-states. By having a node which generates link information advertise a packet known as a link-state packet to an adjacent node, and having this node then advertise a link state packet to an adjacent node, every node within the autonomous system can become aware of the link-states. In this manner, it is possible to share link-states between every node within the network using OSPF.

Figure 11:
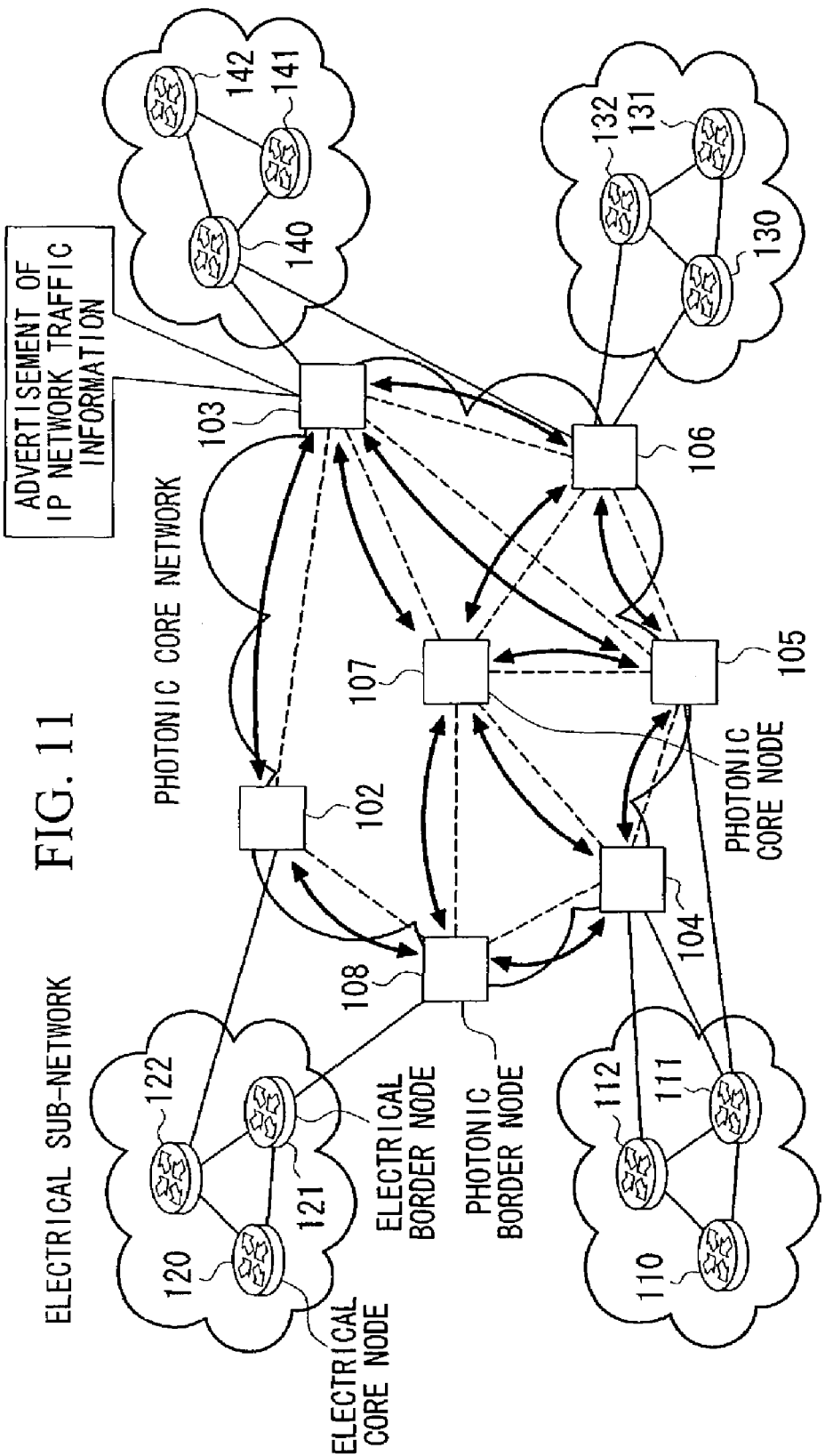
FIG. 11 is a diagram outlining the propagation of traffic information in the present embodiment.

Using this transmission scheme, information on traffic quantity is exchanged between photonic border routers, and between photonic border nodes and electrical border nodes. FIG. 11 outlines the transmission of traffic information in the present embodiment.

An electrical border node 140 appends traffic information to a link-state packet and advertises this link-state packet to a photonic border node 103. Upon receipt of this packet, the photonic border node 103 then advertises the link-state packet to the adjoining photonic nodes 102, 107, 106. These photonic nodes then advertise the link-state packet to any adjacent photonic nodes. When the photonic nodes receive further copies of a link-state packet which has already been received, the photonic nodes do not perform any further advertising of the link-state packet. By repeating this process, it is possible for each photonic border node and electrical border node to gather information on the traffic between each of the electrical sub-networks. Furthermore, by using a modified version of OSPF, it is possible for each photonic border node and electrical border node to gather information on the traffic between each of the electrical sub-networks.

Embodiment 2

Figure 12:
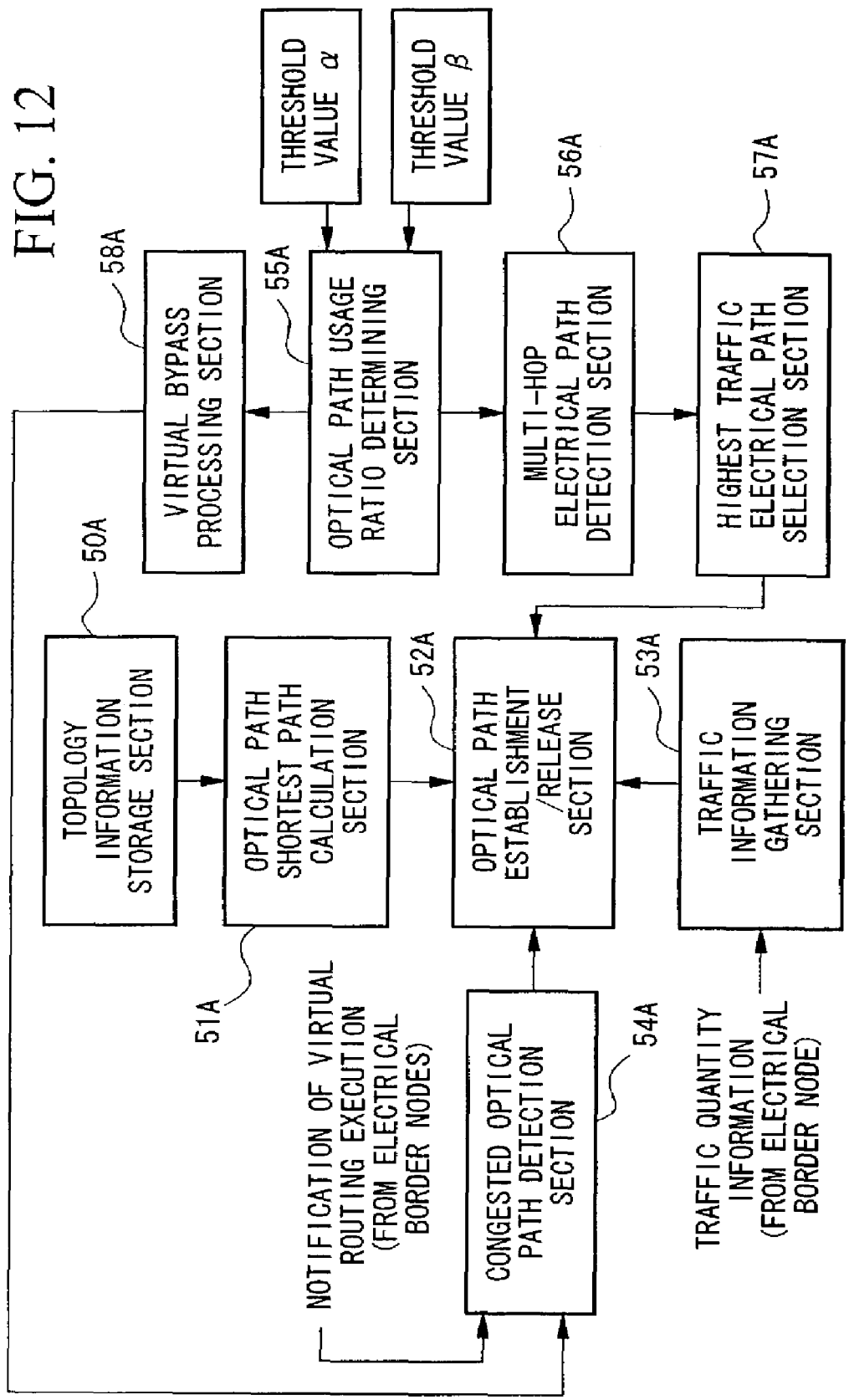
FIG. 12 is a block diagram showing a photonic border node of the present embodiment.
Figure 13:
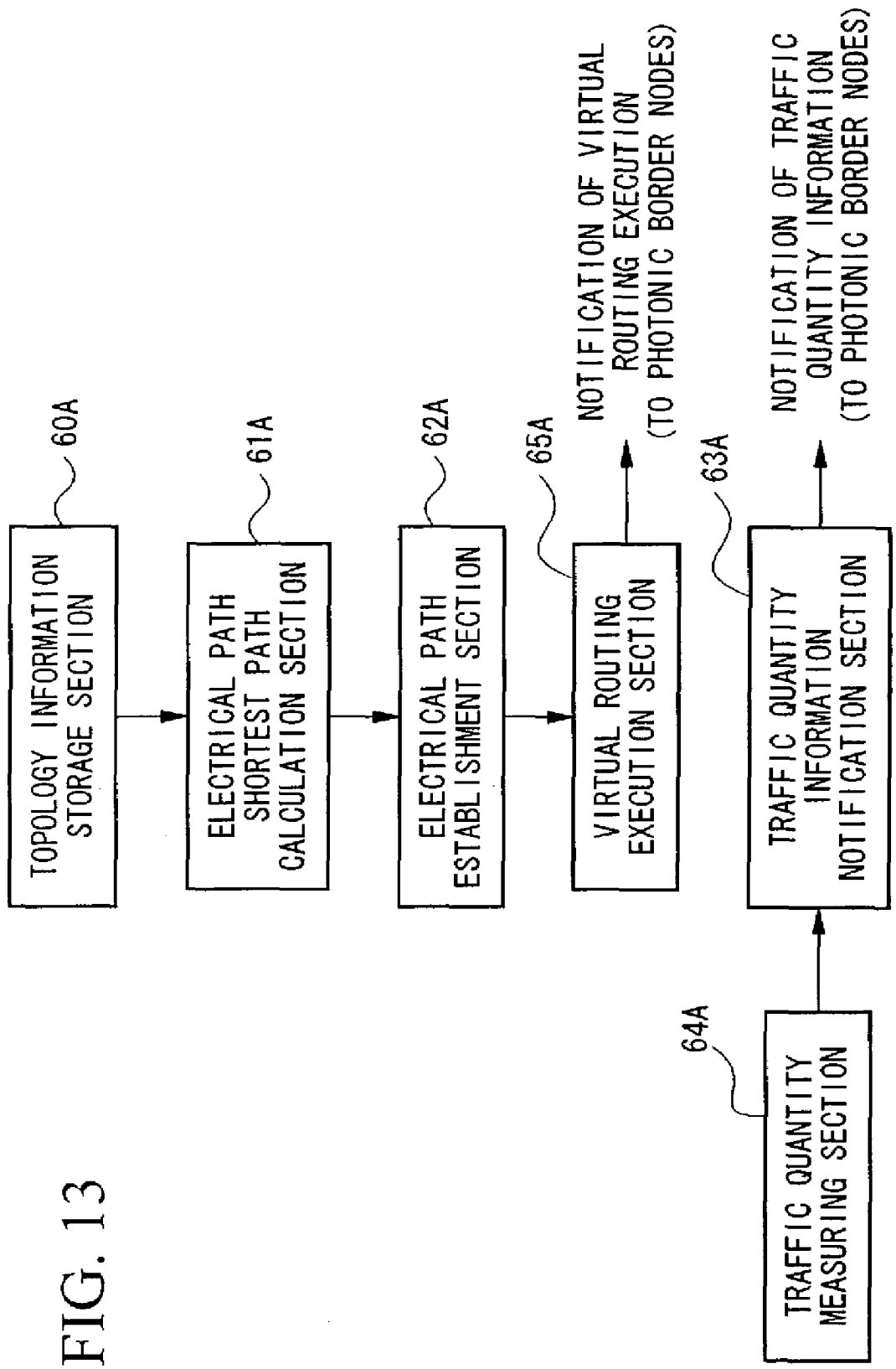
FIG. 13 is a block diagram showing an electrical border node of the present embodiment.
Figure 14:
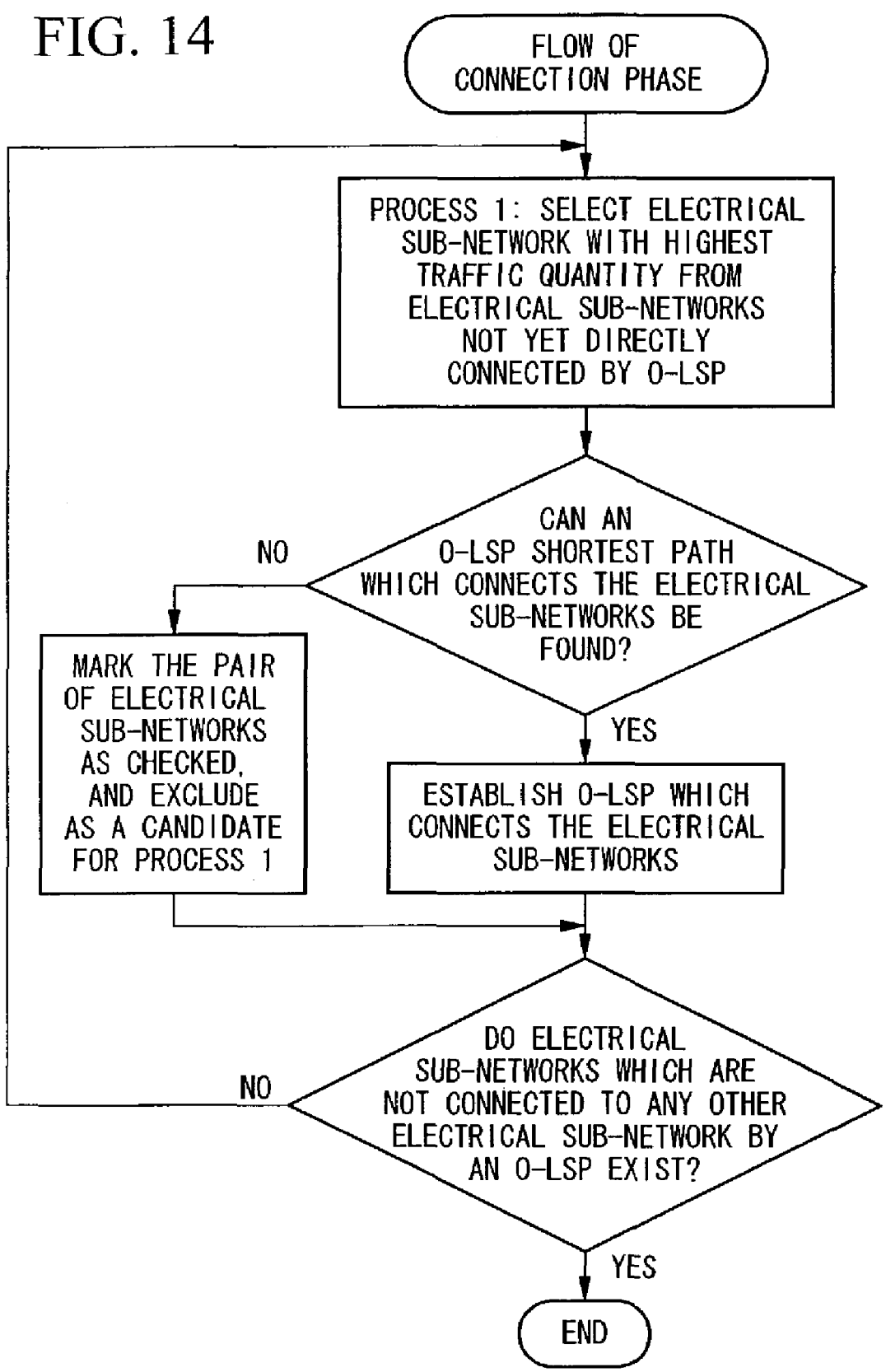
FIG. 14 is a flowchart showing the operational steps in a connection phase of the present embodiment.
Figure 15:
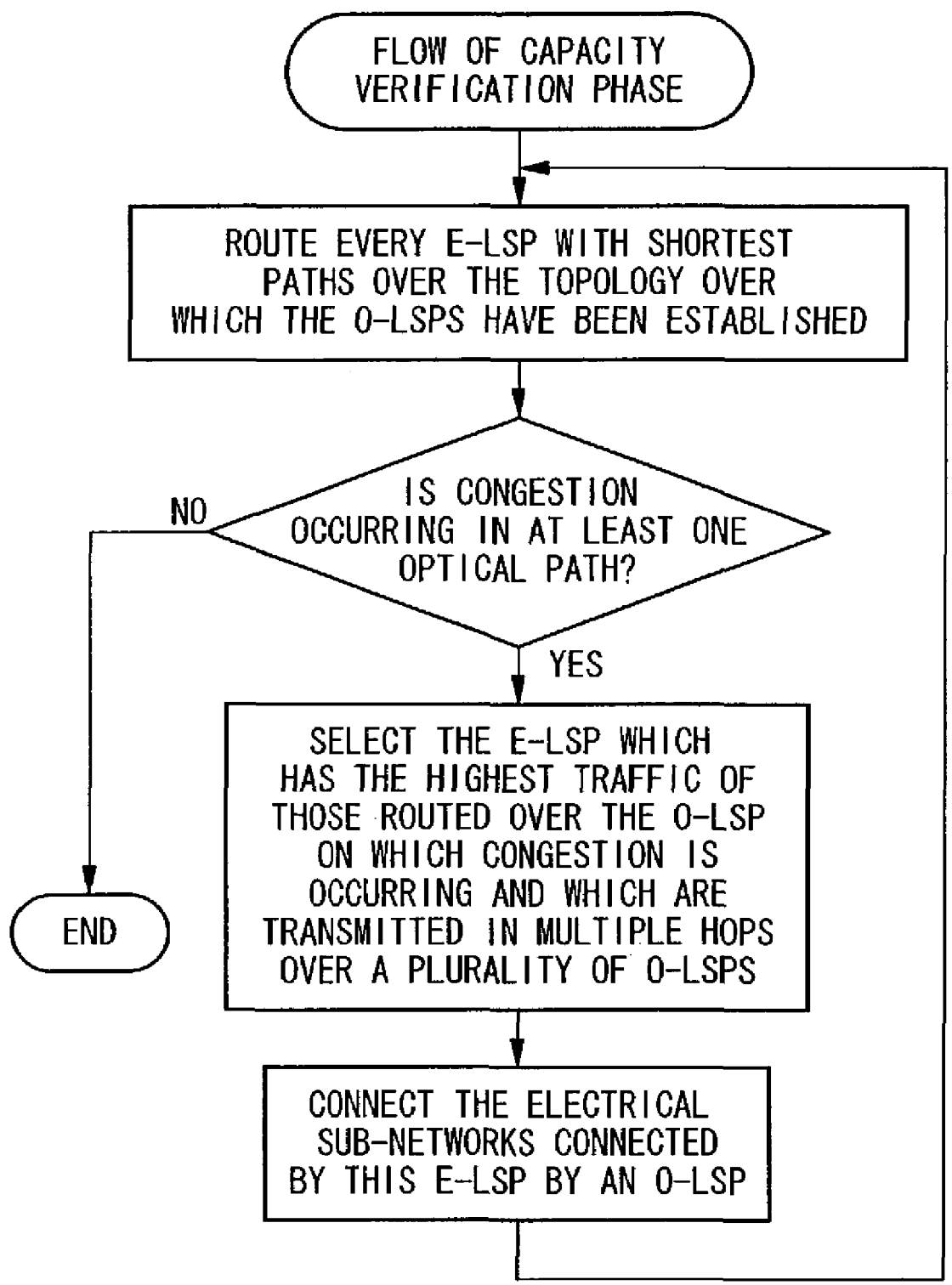
FIG. 15 is a flowchart showing the operational steps in a capacity verification phase of the present embodiment.
Figure 16:
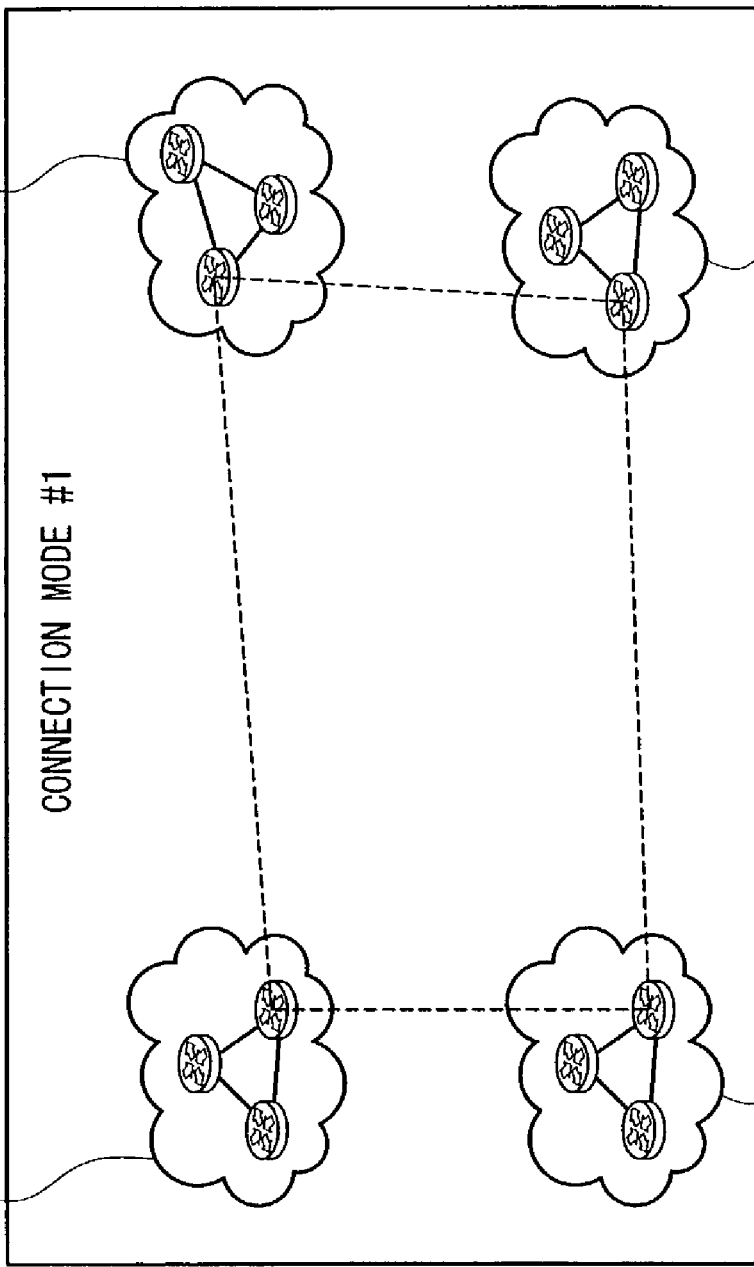
FIG. 16 is a diagram showing a connection mode #1 of the electrical sub-networks.
Figure 17:
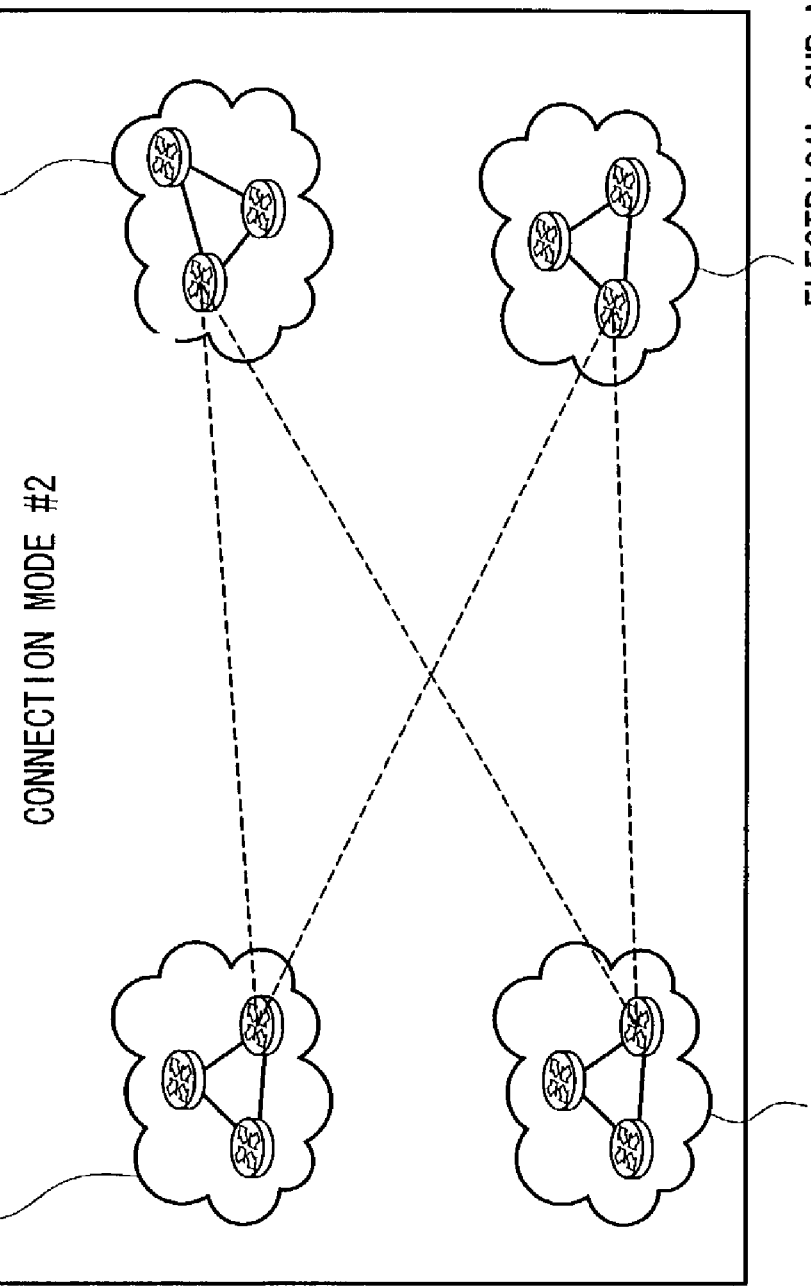
FIG. 17 is a diagram showing a connection mode #2 of the electrical sub-networks.
Figure 20:
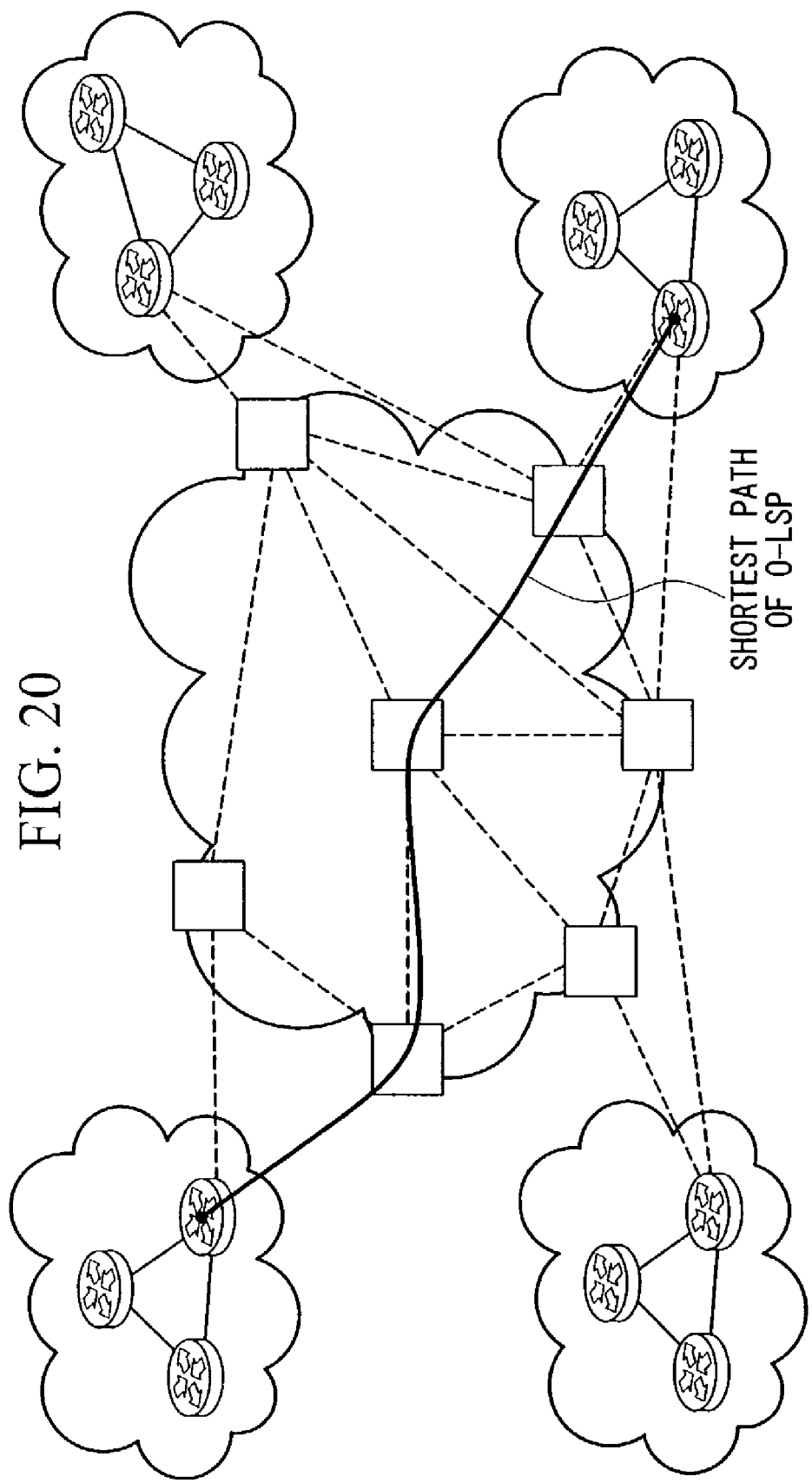
FIG. 20 is a diagram showing an example of a shortest path of an O-LSP.
Figure 21:
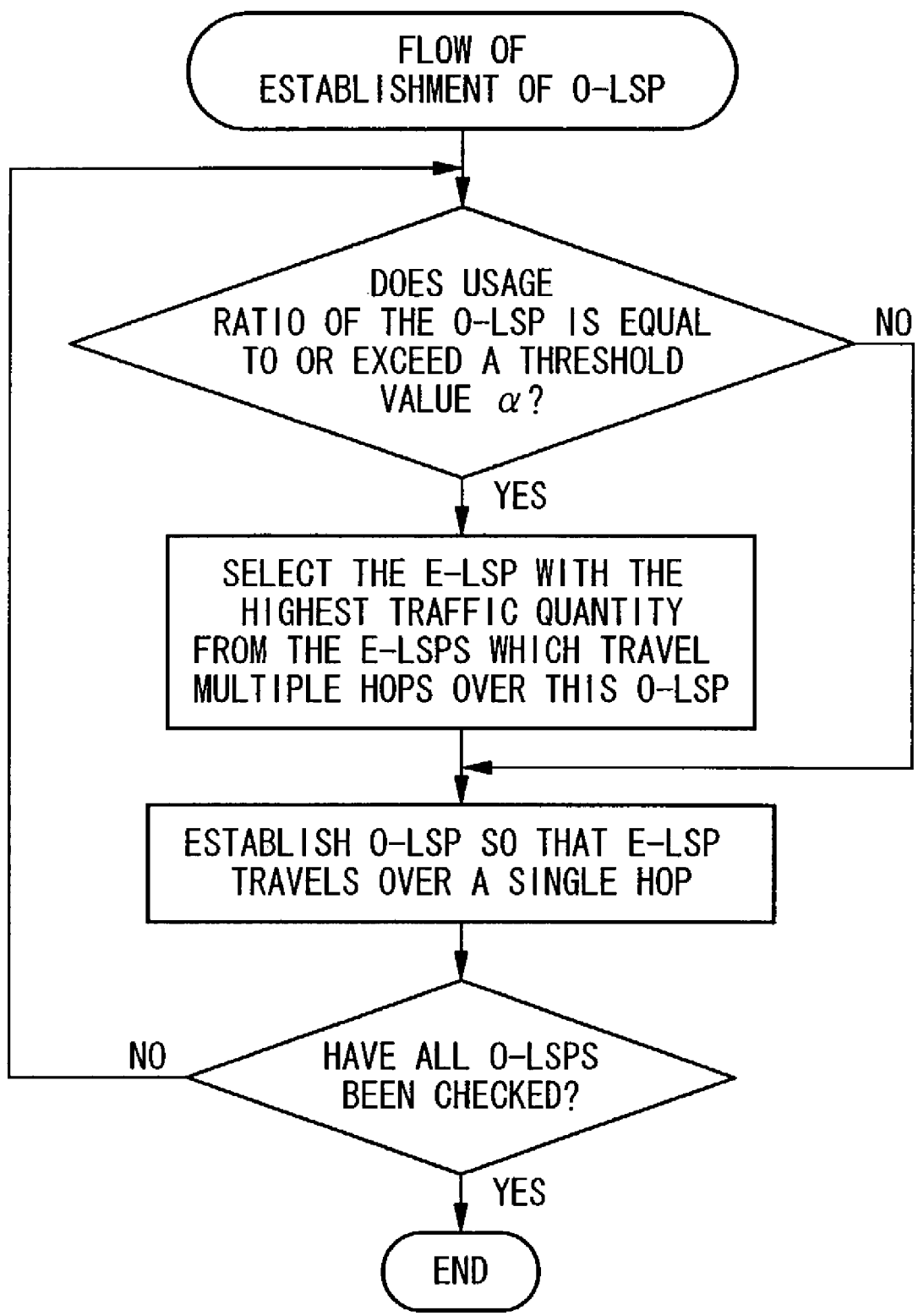
FIG. 21 is a flowchart showing an additional O-LSP establishing procedure of the present embodiment.
Figure 22:
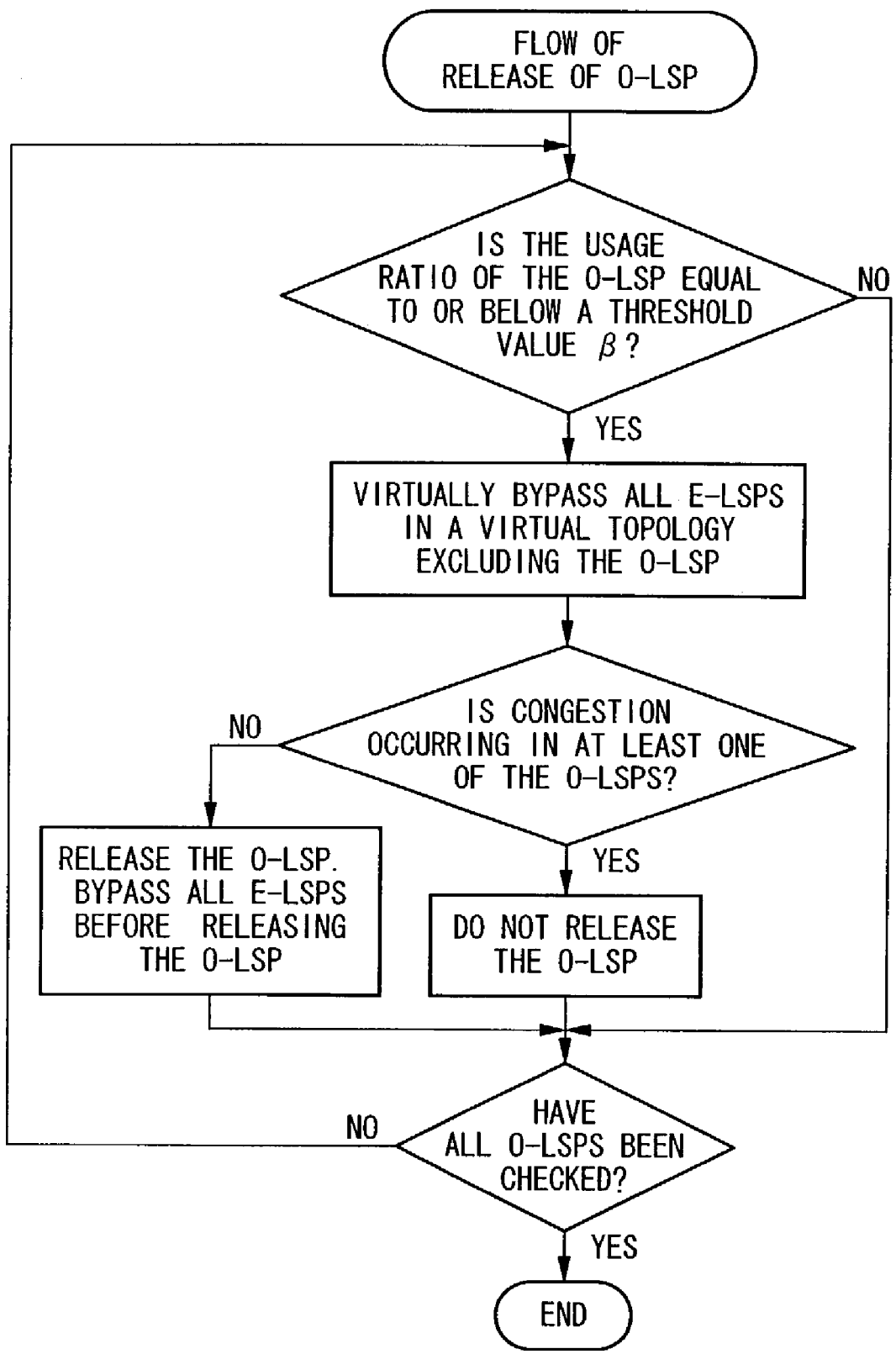
FIG. 22 is a flowchart showing an O-LSP releasing procedure of the present embodiment.
Figure 23:
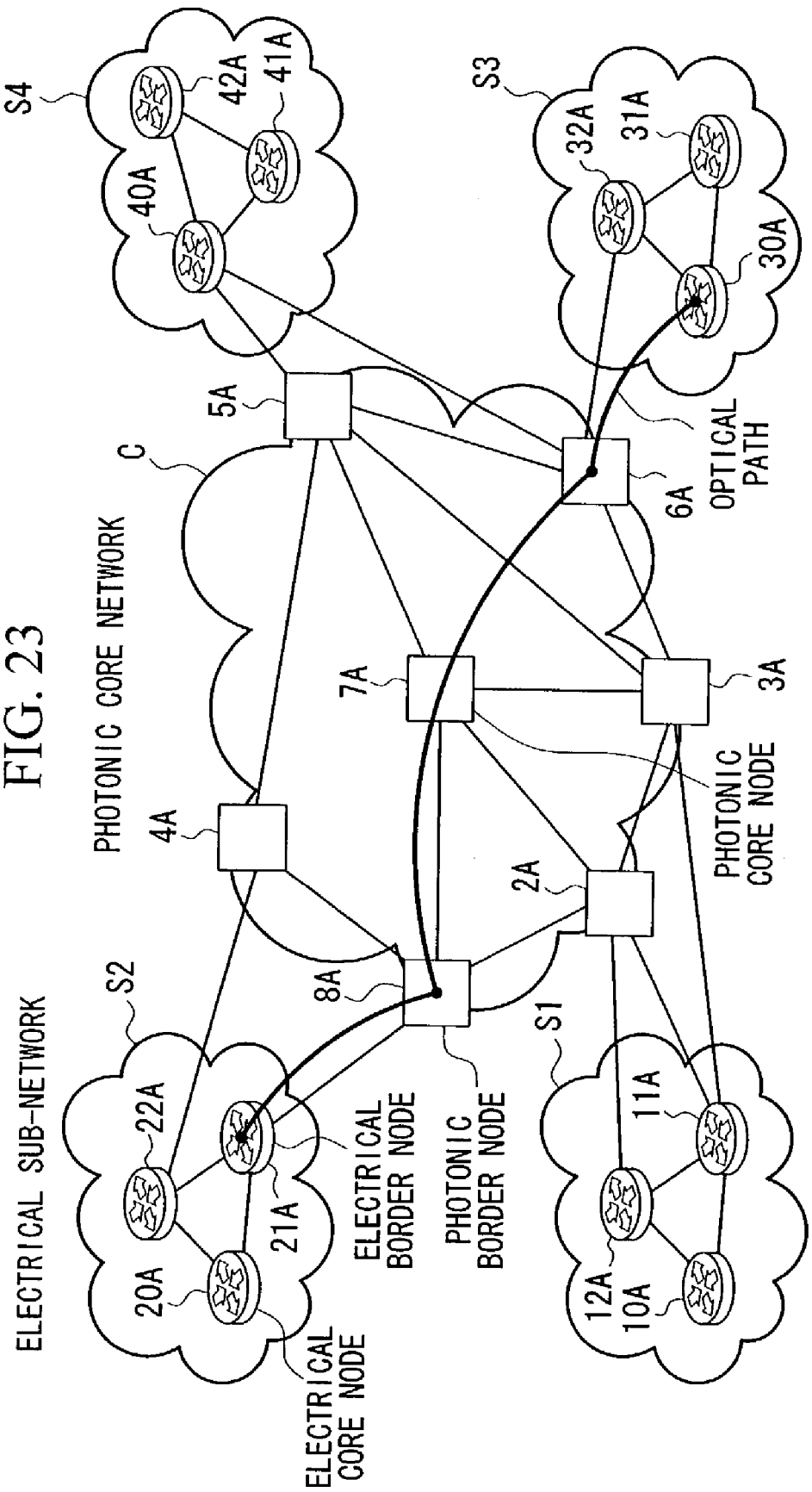
FIG. 23 is a diagram showing the entire structure of the optical/electrical path integrated network.
Figure 24:
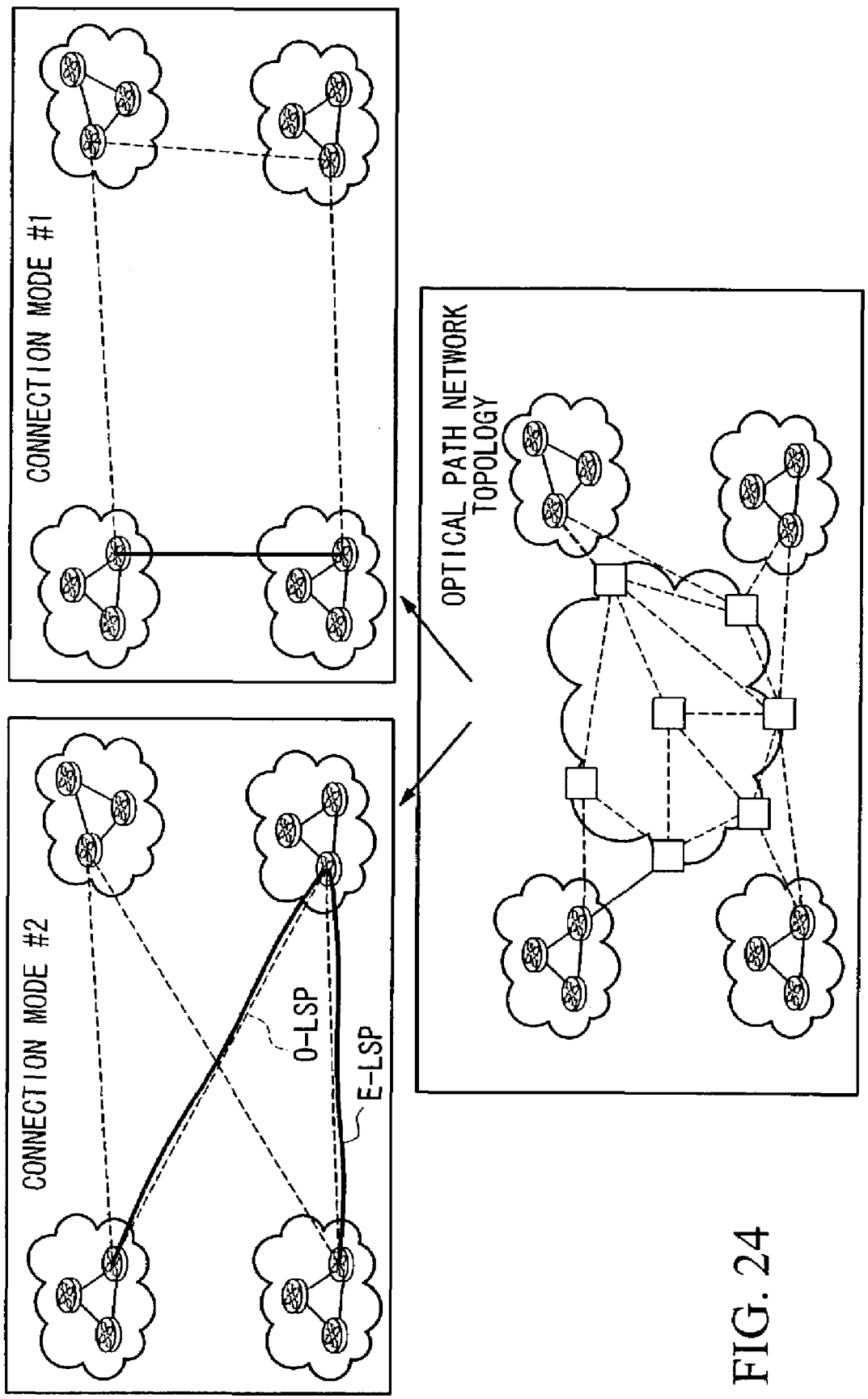
FIG. 24 is a diagram showing a connection mode of the electrical network.
Figure 25:
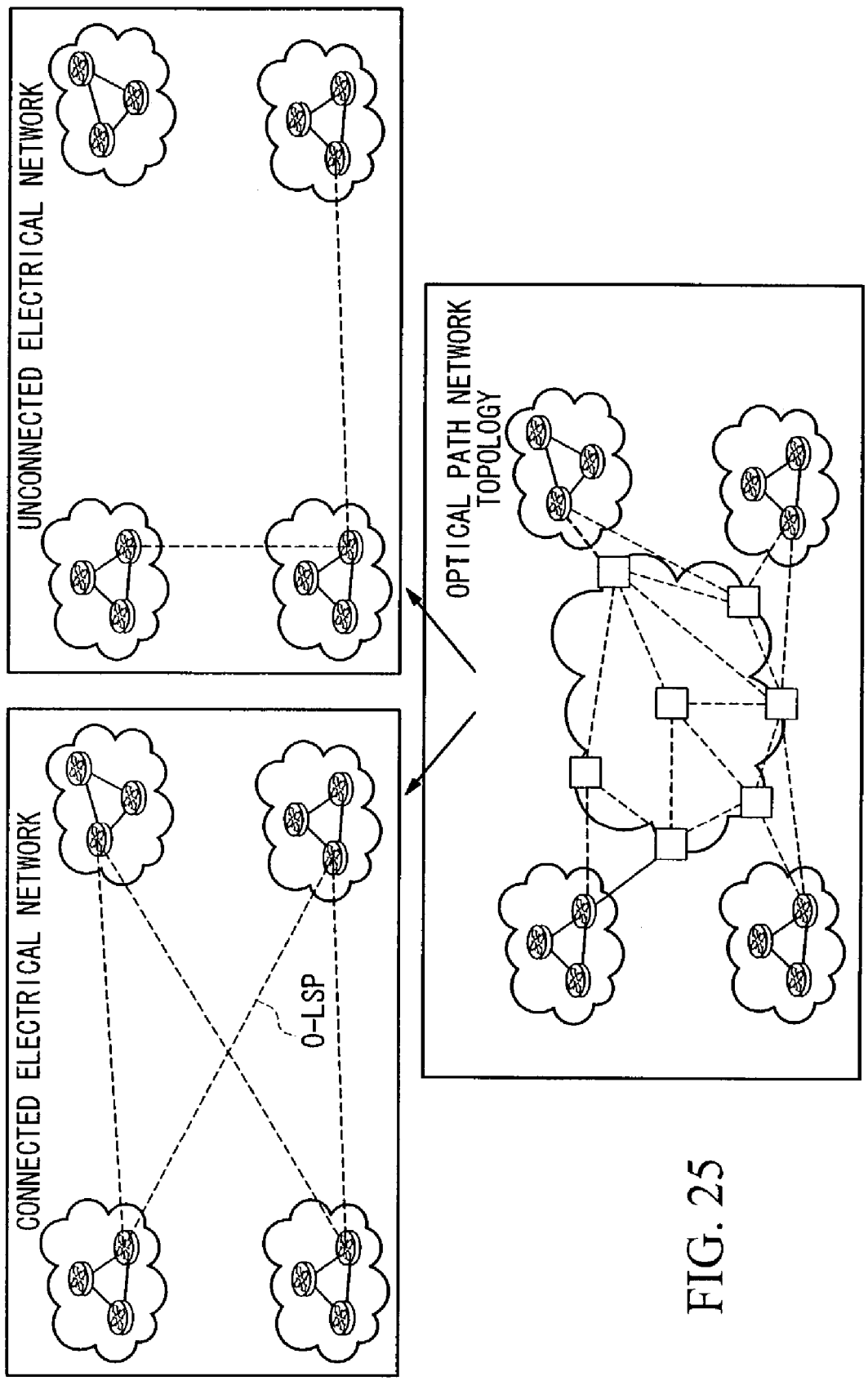
FIG. 25 is a diagram describing a connected electrical network and an unconnected electrical network.

A second embodiment of an optical/electrical path integrated network is described below, referring to FIG. 12 through FIG. 22. FIG. 12 is a block diagram showing a photonic border node of the second embodiment. FIG. 13 is a block diagram showing an electrical border node of the second embodiment. FIG. 14 is a flow chart showing the operational steps in a connection phase of the present embodiment. FIG. 15 is a flowchart showing the operational steps in a capacity verification phase of the present embodiment. FIG. 16 is a diagram showing a connection mode #1 of the electrical sub-networks. FIG. 17 is a diagram showing a connection mode #2 of the electrical sub-networks. FIG. 18 is a diagram showing a traffic matrix. FIG. 19 is a diagram showing an E-LSP hop count matrix. FIG. 20 is a diagram showing an example of a shortest path of an O-LSP. FIG. 21 is a flowchart showing an additional O-LSP establishing procedure of the present embodiment. FIG. 22 is a flowchart showing an O-LSP releasing procedure of the present embodiment. Furthermore, the entire construction of the optical/electrical path integrated network is shown in FIG. 23.

The optical/electrical path integrated network according to the second embodiment comprises electrical sub-networks S1 to S4 which exchange data in packet units, and a photonic core network C which interconnects these electrical sub-networks S1 to S4, in which the photonic core network C comprises photonic border nodes 1 to 6 and a photonic core node 7, and the electrical sub-networks S1 to S4 comprise electrical border nodes 11A, 12A, 21A, 22A, 30A, 32A, 40A, and electrical core nodes 10, 20, 31, 41, 42, and the electrical border nodes 11A, 12A, 21A, 22A, 30A, 32A and 40A and the photonic border nodes 1A to 6A provided in the electrical sub-networks S1 to S4 and the photonic core network C which are contiguous are directly connected.

Here, a characteristic of the second embodiment is that the photonic border nodes 1A to 6A comprise a topology information storage section 50A which stores the topology information of the photonic core network C, an optical path shortest path calculation section 51A which calculates a shortest path between the photonic border nodes 1A to 6A based on the topology information stored in the topology information storage section 50A, and an optical path establishment/release section 52A which establishes an optical path over this shortest path calculated by the optical path shortest path calculation section 51A, and that the electrical border nodes 11A, 12A, 21A, 22A, 30A, 32A, 40A comprise a topology information storage section 60A which stores the topology information of the network constructed from the optical paths established over the photonic core network C, an electrical path shortest path calculation section 61A which calculates the shortest path between the electrical border nodes 11A, 12A, 21A, 22A, 30A, 32A and 40A based on the topology information stored in the topology information storage section 60A, and an electrical path establishing section 62A which establishes an electrical path over the shortest path calculated by the electrical path shortest path calculation section 61A, and is further characterized in that a traffic quantity information measuring section 64A which detects the two electrical sub-networks of the electrical sub-networks S1 to S4 which exchange the highest quantity of traffic and are not yet connected by an optical path, a traffic quantity information notification section 63A, and a traffic information gathering section 53A are provided, and in that the optical path establishment/release section 52A establishes an optical path between the two electrical sub-networks detected by the traffic information gathering section 53A.

In addition, the electrical path establishing sections 62A in the electrical border nodes comprise a virtual routing execution section 65A which establishes electrical paths over the shortest paths between the electrical sub-networks S1 to S4 on the optical paths established by the optical path establishment/release section 52A, and performs virtual routing via these established electrical paths, and the photonic border nodes comprise congested optical path detection sections 54A which detect the congested locations on the optical paths after this virtual bypassing is performed based on the results of the virtual routing performed by the virtual routing execution section 65A, and the optical path establishment/release section 52A, which when a congested optical path as detected by this congested optical path detection section 54A does not directly connect the electrical sub-networks which are causing the congestion, newly establishes an optical path which directly connects these electrical sub-networks.

Furthermore, the photonic border node preferably comprises an optical path usage ratio determining section 55A which determines whether or not the usage ratio of the optical paths is equal to or greater than a threshold value α, and further comprises a multi-hop electrical path detection section 56A which detects those electrical paths which do not directly connect between electrical sub-networks which travel optical paths which have the usage ratio equal to or greater than the threshold value α based on the results of the optical path usage ratio determining section 55A, and a highest traffic electrical path selection section 57A which selects the electrical path which carries the highest traffic quantity from the electrical paths detected by this multi-hop electrical path detection section 56A, and the optical path establishment/release section 52A establishes an optical path so that the electrical path selected by the highest traffic electrical path selection section 57A directly connects the electrical sub-networks S1 to S4.

Furthermore, the optical path usage ratio determining section 55A determines whether or not the usage ratio of the established optical paths is equal to or below a threshold value β, and the photonic border node comprises a virtual bypass processing section 58A which virtually bypasses electrical paths established over optical paths which have the usage ratio equal to or below the threshold value β to other optical paths based on this determination, and the congested optical path detection section 54A detects congested locations upon the optical paths after the virtual bypassing is performed by the virtual bypass processing section 58A, and the optical path establishment/release section 52A actually releases the optical paths which have the usage ratio equal to or below the threshold value β after the virtual bypassing has actually been performed, when congested optical paths are not detected by the congested optical path detection section 54A.

The apparatus which controls the photonic border nodes 1A to 6A and the electrical border nodes 11A, 12A, 21A, 22A, 30A, 32A and 40A is realized using a computer. In other words, by installing a program on a computer which enables the computer to realize the functions required of an apparatus which controls the nodes for use with the optical/electrical path integrated network of the present embodiment, it is possible to obtain a device which controls the photonic border nodes 1A to 6A and the electrical border nodes 11A, 12A, 21A, 22A, 30A, 32A, 40A, wherein the program realizes at least one of; a function corresponding with the topology information storage section 50A which stores the topology information of the photonic core network C, a function corresponding with the optical path shortest path calculation section 51A which calculates the shortest path between the photonic border nodes 1A to 6A based on the topology information stored in the topology information storage section 50A, a function corresponding with the optical path establishment/release section 52A which establishes an optical path over the shortest path calculated by the optical path shortest path calculation section 51A, a function corresponding with the topology information storage section 60A which stores the topology information of the network constructed from the optical paths established on the photonic core network C, a function corresponding with the electrical path shortest path calculation section 61A which calculates the shortest path between the electrical border nodes based on the topology information stored in the topology information storage section 60A, a function corresponding with the electrical path establishing section 62A which establishes an electrical path over the shortest path calculated by the electrical path shortest path calculation section 61A, and functions corresponding with the traffic measuring section 64A which detects the two electrical sub-networks not yet directly connected by electrical paths which exchange the highest quantity of traffic, the traffic quantity information notification section 63A, and the traffic information gathering section 53A. Moreover this also realizes an optical path establishment function which establishes an optical path between the two electrical sub-networks detected by the traffic information gathering section 53A, as a function corresponding with the optical path establishment/release section 52A. Furthermore this realizes an electrical path establishment function which establishes electrical paths over the shortest paths between the electrical sub-networks on the optical path established by the optical path establishment/release section 52A, as a function corresponding with the electrical path establishing section 62A, and realizes a function corresponding with the virtual routing execution section 65A which performs virtual routing via the electrical paths established by the electrical path establishment function, and a function corresponding with the congested optical path detection section 54A which detects the congested locations on the optical paths after this virtual bypassing is performed based on the results of the virtual routing performed by the virtual routing execution section 65A, and realizes a new optical path establishment function which when a congested optical path as detected by this congested optical path detection section 54A does not directly connect the electrical sub-networks which are causing the congestion, newly establishes an optical path which directly connects these electrical sub-networks, as a function corresponding with the optical path establishment/release section 52A. Furthermore, this realizes a function corresponding with the optical path usage ratio determining section 55A which determines whether or not the usage ratio of the optical paths established by the optical path establishment/release section 52A is equal to or above a threshold value $\alpha$, and comprises a function corresponding with the multi-hop electrical path detection section 56A which detects those electrical paths which do not directly connect between electrical sub-networks which travel optical paths which have the usage ratio equal to or greater than the threshold value $\alpha$ based on the results of the optical path usage ratio determining section 55A, and a function corresponding with the highest traffic electrical path selection section 57A which selects the electrical path which carries the highest traffic quantity from the electrical paths detected by this multi-hop electrical path detection section 56A. The program also realizes an optical path adding function which establishes an optical path so that the electrical path selected by the highest traffic electrical path selection section 57A directly connects the electrical sub-networks as a function corresponding with the optical path establishment/release section 52A. Furthermore this realizes a function which determines whether or not the usage ratio of the optical paths established by the optical path establishment/release section 52A is equal to or below a threshold value $\beta$, as a function corresponding with the optical path usage ratio determining section 55A, and realizes a function corresponding with the virtual bypass processing section 58A which virtually bypasses electrical paths established over optical paths which have the usage ratio equal to or below the threshold value $\beta$ to other optical paths based on the determination of the determining function, and a function which detects congested locations upon the optical paths after the virtual routing is performed by the virtual bypass processing section 58A, as a function corresponding with the congested optical path detection section 54A, and a function which actually releases the optical paths which have the usage ratio equal to or below the threshold value $\beta$ after the virtual bypassing has actually been performed by the virtual bypass processing section 58A, when congested optical paths are not detected by the congested optical path detection section 54A.

In the description of the present embodiment, the function corresponding with the virtual routing execution section 65A was provided by the electrical border nodes 11A, 12A, 21A, 22A, 30A, 32A, 40A, but this function could also be provided by the photonic border nodes 1A to 6A.

Furthermore, in the description of the present embodiment, the function corresponding with the congested optical path detection section 54A which detects congested locations on the optical paths based on the results of the virtual routing performed by the virtual routing execution section 65A or based on the virtual bypass processing performed by the virtual bypass processing section 58A, the function corresponding with the optical path usage ratio determining section 55A which determines whether or not the usage ratio of the optical paths established by the optical path establishment/release section 52A is equal to or above a threshold value $\alpha$, the function corresponding with the multi-hop electrical path detection section 56A which detects those electrical paths which do not directly connect between electrical sub-networks which travel optical paths which have the usage ratio equal to or greater than the threshold value $\alpha$ based on the results of the optical path usage ratio determining section 55A, the function corresponding with the highest traffic electrical path selection section 57A which selects the electrical path with the highest traffic from the electrical paths detected by the multi-hop electrical path detection section 56A, the function corresponding with the optical path usage ratio determining section 55A which determines whether or not the usage ratio of the optical paths is equal to or below a threshold value $\beta$, and the function corresponding with the virtual bypass processing section 58A which virtually bypasses electrical paths established over optical paths which have the usage ratio equal to or below the threshold value $\beta$ to other optical paths based on this determination, were provided by the photonic border nodes 1A to 6A, but these functions could also be provided by the electrical border nodes 11A, 12A, 21A, 22A, 30A, 32A, 40A.

By storing the program of the second embodiment on the storage medium of the present embodiment, the computer can install the program of the present embodiment using this storage medium. Alternatively, the program of the present embodiment may be directly installed on the computer over a network, from a server on which the program of the present embodiment is stored.

Accordingly, by automatically performing the establishment or release of optimal optical paths according the traffic quantity between the electrical sub-networks using an information processing apparatus such as a computer, an optical/electrical path integrated network and a node which can make effective use of network resources without requiring the intervention of the network administrator can be realized.

The second embodiment is described in further detail below.

All of the electrical sub-networks S1 to S4 are interconnected by electrical paths (E-LSPs), in a full mesh. The E-LSPs are routed over the entire electrical network constructed from the electrical sub-networks S1 to S4, which are interconnected by the optical paths (O-LSP) established over the photonic core network C. When the electrical sub-networks S1 to S4 are connected by multiple-hop routing, the E-LSP which connects the sub-networks traverses a plurality of O-LSPs.

The traffic quantity between the electrical sub-networks S1 to S4 can be determined by counting the packets flowing over the E-LSPs. The traffic between all of the electrical sub-networks S1 to S4 can be expressed as a matrix, called a traffic matrix. A traffic matrix is shown in FIG. 18. The example in FIG. 18 shows the traffic matrix of a network comprising N electrical sub-networks, and the components (i, j) in the matrix represent the traffic quantity from electrical sub-network i to electrical sub-network j.

This traffic matrix is applied to each of the photonic border nodes 1A to 6A. The photonic border nodes 1A to 6A establish or release optical paths in an autonomous manner based on this information.

The steps involved in establishing O-LSPs based on the traffic matrix are described below. In the present invention, first O-LSPs are established until the electrical sub-networks S1 to S4 are "connected", to use the terminology of graph theory (this is called the connection phase), and the E-LSPs are then routed over the entire electrical network formed by being interconnected by the O-LSPs, and steps to verify whether or not the necessary number of O-LSPs have been established are followed (this is called the capacity verification phase). When establishing the O-LSPs, the shortest paths are calculated based on a topology in which the photonic core network C has free resources, and the O-LSPs are established along these paths.

FIG. 14 shows a flowchart of the connection phase. The E-LSP with the highest traffic quantity is selected from the traffic matrix, and an O-LSP is established so that this E-LSP can be connected by a single hop. If an O-LSP cannot be established at the time, the E-LSP is then marked as having been checked. The E-LSPs are then checked in descending order of traffic quantity, and these steps are repeated until all of the electrical sub-networks are "connected".

FIG. 15 shows a flowchart of the capacity verification phase. Once all of the electrical sub-networks S1 to S4 are "connected", capacity verification is performed to verify whether sufficient bandwidth for the E-LSP is secured. Virtual routing is then performed, supposing an electrical network in which all of the E-LSPs are interconnected by O-LSPs. In this case, routing is performed in accordance with shortest paths. The shortest paths for the E-LSPs can be calculated based on the topology information of the established O-LSPs and the electrical network.

After virtual routing is performed for all of the E-LSPs, the O-LSPs are checked for congestion. A determination is made that congestion is present if the usage ratio of the O-LSP exceeds the threshold value α. Whether or not the E-LSP with the highest traffic quantity of the E-LSPs which is routed over the congested O-LSP are routed by multiple hop routing over a congested O-LSP can be connected by a direct O-LSP is tested. If such an O-LSP cannot be connected, the E-LSPs are checked in descending order of traffic quantity. Once an O-LSP can be established, virtual routing of all of the E-LSP is performed again, and whether or not the capacity of the O-LSP is sufficient is verified. The steps above are repeated until congestion does not occur in any of the O-LSPs.

FIG. 19 is an E-LSP hop count matrix. This matrix stores the number of hops of the O-LSP via which each E-LSP is routed. This E-LSP hop count matrix is used during the capacity verification phase to search for E-LSPs which are candidates for the establishment of direct O-LSPs. In other words, sometimes an increase in the hop count of the E-LSP leads to an increase in the use of O-LSP resources, and consequently when an O-LSP is congested, it is desirable to reduce the hop count of such E-LSPs.

FIG. 20 shows how an O-LSP is routed over a shortest path over the photonic core network C. By performing routing over the shortest path, it is possible to keep the use of the resources of the photonic core network C to a minimum.

If the traffic matrix changes after the establishment of the O-LSPs has been completed, the O-LSPs need to be reconfigured accordingly. FIG. 21 and FIG. 22 are flowcharts showing the establishment and release of O-LSPs.

FIG. 21 is a flowchart showing how O-LSPs are newly established when the traffic matrix has changed. If the usage ratio of the O-LSP exceeds the threshold value α, the E-LSP which travels by multiple hop routing and has the highest traffic quantity of those passing through the O-LSP is selected, and whether or not an O-LSP which can carry this E-LSP directly via a single hop can be established is checked. If such an O-LSP cannot be established, the E-LSP with the next highest traffic quantity is nominated.

FIG. 22 is a flowchart showing how O-LSPs are released when the traffic matrix has changed. If the usage ratio of an O-LSP is equal to or below a threshold value β, checks are performed to determine whether or not the O-LSP can be released. In this case, checks are performed to determine whether the network would remain "connected" and whether there would be sufficient capacity if the O-LSP is released. To determine whether or not there is sufficient capacity, whether or not another O-LSP has sufficient resources to accept the bandwidth of the E-LSPs which are bypassed after the O-LSP is released is verified. This is achieved by virtually bypassing all of the E-LSPs established over the O-LSP which is to be released to another O-LSP, and determining whether or not congestion occurs on the O-LSP as a result. If it is safe to release the O-LSP, then first the topology after the O-LSP is released is assumed, and the E-LSPs are bypassed in advance. Once all of the E-LSPs have been bypassed, the O-LSP is released.

What is claimed is:

1. An electrical border node for use with an optical/electrical path integrated network which includes a plurality of electrical sub-networks comprising electrical border nodes and electrical core nodes which are interconnected by electrical paths and which perform routing based on packet header information and a photonic core network comprising photonic border nodes and photonic core nodes which are interconnected by optical paths, the photonic core network and the plurality of electrical sub-networks being interconnected by optical paths, the electrical border node comprising:

an outputting device which comprises a measuring device which measures traffic guantity between an own electrical sub-network to which the electrical border node belongs and other electrical sub-networks, and a notification device which notifies the photonic border nodes within the photonic core network about information relating to traffic guantity based on a result from the measuring device;

a storage device which stores topology information of a network constructed from optical paths established over the photonic core network;

a calculating device which calculates a shortest path between the electrical border nodes based on the topology information stored in the storage device;

an establishment device which establishes an electrical path over the shortest path calculated by the calculating device; and a detection device which detects two electrical sub-networks which are exchanging a highest quantity of traffic from among electrical sub-networks which are not yet connected by an optical path.

2. An electrical border node according to claim 1, wherein the establishment device comprises an electrical path establishment device which establishes an electrical path over the shortest path between the electrical sub-networks on the optical path established by optical path establishment device, and a device which performs virtual routing over the electrical path established by the electrical path establishment device, and the outputting device outputs a result of the routing.

3. A photonic border node for use with an optical/electrical path integrated network which includes a plurality of electrical sub-networks comprising electrical border nodes and electrical core nodes which are interconnected by electrical paths and which perform routing based on packet header information and a photonic core network comprising photonic border nodes and photonic core nodes which are interconnected by optical paths, the photonic core network and the plurality of electrical sub-networks being interconnected by optical paths, the photonic border node comprising:

an exchanging device which exchanges information relating to traffic quantity received from an electrical border node with another photonic border node;

a gathering device which gathers information relating to traffic quantity between the plurality of electrical sub-networks based on a plurality of pieces of the information relating to traffic quantity exchanged by the exchanging device; and a connection mode setup device which sets up a connection mode between the electrical sub-networks based on the information relating to traffic gathered by the gathering device.

4. A photonic border node according to claim 3, wherein the connection mode setup device comprises a device which sets a distance between electrical sub-networks between which traffic is generated, in inverse proportion to a quantity of the traffic.

5. A photonic border node according to claim 3, wherein when a connection mode between the electrical sub-networks is changed by the connection mode setup device, the exchanging device exchanges optical path establishment change information including information detailing the change, with other photonic border nodes in a photonic core network, the gathering device gathers network topology information based on a plurality of pieces of the optical path establishment change information exchanged by the exchanging device, and the photonic border node further comprises a notification device which notifies an electrical border node in an electrical sub-network about the network topology information gathered by the gathering device.

6. A photonic border node according to claim 3, wherein the connection mode setup device comprises a device which sets a distance between electrical sub-networks between which traffic is generated, in inverse proportion to a quantity of the traffic.

7. A photonic border node according to claim 3, wherein when a connection mode between the electrical sub-networks is changed by the connection mode setup device, the exchanging device exchanges optical path establishment change information including information detailing the change, with other photonic border nodes, the gathering device gathers network topology information based on a plurality of pieces of the optical path establishment change information exchanged by the exchanging device, and the photonic border node further comprises a notification device which notifies an electrical border node about the network topology information gathered by the gathering device.

8. A photonic border node for use with an optical/electrical path integrated network which includes a plurality of electrical sub-networks comprising electrical border nodes and electrical core nodes which are interconnected by electrical paths and which perform routing based on packet header information and a photonic core network comprising photonic border nodes and photonic core nodes which are interconnected by optical paths, the photonic core network and the plurality of electrical sub-networks being interconnected by optical paths, the photonic border node comprising:

a storage device which stores topology information for the photonic core network;

a calculating device which calculates a shortest path between the photonic border nodes based on the topology information stored in the storage device; and an establishment device which establishes an optical path over the shortest path calculated by the calculating device, wherein the establishment device comprises an optical path establishment device, which establishes an optical path between the two electrical sub-networks.

9. A photonic border node according to claim 8, comprising:

a congested optical path detection device which detects congested locations on an optical path based on a result of virtual routing performed over the electrical paths, and a new optical path establishment device which when a congested optical path as detected by the congested optical path detection device does not directly connect the electrical sub-networks which are causing the congestion, newly establishes an optical path which connects the electrical sub-networks.

10. A photonic border node according to claim 9, further comprising:

a determining device which determines whether or not the usage ratio of the optical path established by either one of the optical path establishment device and the new optical path establishment device exceeds a threshold value α;

a multi-hop electrical path detection device which detects those electrical paths which do not connect electrical sub-networks which travel optical paths which have the usage ratio equal to or greater than the threshold value α, based on the results of the determining device;
a selection device which selects an electrical path which carries a highest quantity of traffic from the electrical paths detected by the multi-hop electrical path detection device; and
an optical path adding device which establishes an optical path so that the electrical path selected by the selection device connects the electrical sub-networks.

11. A photonic border node according to claim 10, wherein
the determining device determines whether or not the usage ratio of the optical paths established by any one of the optical path establishment device, the new optical path establishment device, and the optical path adding device is equal to or below a threshold value β,
the photonic border node further comprises a bypassing device which virtually bypasses electrical paths established over an optical path which has the usage ratio equal to or below the threshold value β to another optical path, based on a result of the determining device,
the congested optical path detection device detects congested locations on optical paths after virtual bypassing is performed by the bypassing device, and
the photonic border node further comprises a releasing device which actually releases optical paths which have the usage ratio equal to or below the threshold value β after the virtual bypassing has actually been performed by the bypassing device when congested optical paths are not detected by the congested optical path detection device.

12. A photonic border node according to claim 9, further comprising:
a determining device which determines whether or not the usage ratio of the optical paths established by either one of the optical path establishment device and the new optical path establishment device is equal to or below a threshold value β; and
a bypassing device which virtually bypasses electrical paths established over an optical path which has the usage ratio equal to or below the threshold value β to another optical path, based on a result of the determining device,
wherein the congested optical path detection device detects congested locations on optical paths after virtual bypassing is performed by the bypassing device, and
the photonic border node further comprises a releasing device which actually releases optical paths which have the usage ratio equal to or below the threshold value β after the virtual bypassing has actually been performed by the bypassing device when congested optical paths are not detected by the congested optical path detection device.

13. A photonic border node according to claim 8, further comprising:
a determining device which determines whether or not the usage ratio of the optical path established by the optical path establishment device is equal to or above a threshold value α;
a multi-hop electrical path detection device which detects those electrical paths which do not connect electrical sub-networks which travel optical paths which have the usage ratio equal to or greater than the threshold value α, based on the results of the determining device;
a selection device which selects an electrical path which carries a highest quantity of traffic from the electrical paths detected by the multi-hop electrical path detection device; and
an optical path adding device which establishes an optical path so that the electrical path selected by the selection device connects the electrical sub-networks.

14. A photonic border node according to claim 13, wherein the determining device determines whether or not the usage ratio of the optical paths established by either one of the optical path establishment device and the optical path adding device is equal to or below a threshold value β,
and the photonic border node further comprises:
a bypassing device virtually bypasses electrical paths which has the usage ratio equal to or below the threshold value β to another optical path, based on a result of the determining device;
a congested optical path detection device which detects congested locations on optical paths after virtual bypassing is performed by the bypassing device; and
a releasing device which actually releases optical paths which have the usage ratio equal to or below the threshold value β after the virtual bypassing has actually been performed by the bypassing device when congested optical paths are not detected by the congested optical path detection device.

15. A photonic border node according to claim 8, further comprising:
a determining device which determines whether or not the usage ratio of the optical paths established by the optical path establishment device is equal to or below a threshold value β;
a bypassing device which virtually bypasses electrical paths established over an optical path which has the usage ratio equal to or below a threshold value β to another optical path, based on a result of the determining device;
a congested optical path detection device which detects congested locations on optical paths after virtual bypassing is performed by the bypassing device, and
a releasing device which actually releases optical paths which have the usage ratio equal to or below the threshold value β after the virtual bypassing has actually been performed by the bypassing device when congested optical paths are not detected by the congested optical path detection device.

16. An optical/electrical path integrated network comprising:
a plurality of electrical sub-networks comprising electrical border nodes and electrical core nodes which are interconnected by electrical paths, in which routing is performed based on packet header information; and
a photonic core network comprising photonic border nodes and photonic core nodes which are interconnected by optical paths,
wherein the photonic core network and the plurality of electrical sub-networks are interconnected between the electrical border nodes and photonic border nodes, respectively, by optical paths,
a node which is an electrical border node of the electrical sub-network comprises:
a measuring device which measures traffic quantity between an own electrical sub-network and other electrical sub-networks; and
a notification device which notifies the photonic border nodes about information relating to traffic quantity based on a result of the measuring device, and a node which is a photonic border node of the photonic core network comprises:
an exchanging device which exchanges the information relating to traffic quantity received from the electrical border node with the photonic border nodes;
a gathering device which gathers information relating to traffic quantity between the plurality of electrical sub-networks based on a plurality of pieces of the information relating to traffic quantity exchanged by the exchanging device; and
a connection mode setup device which sets up a connection mode between the electrical sub-networks based on the information relating to traffic gathered by the gathering device.

17. An optical/electrical path integrated network according to claim 16, wherein the connection mode setup device comprises a device which sets a distance between electrical sub-networks, between which traffic is generated, in inverse proportion to the traffic quantity.

18. An optical/electrical path integrated network according to claim 16, wherein in the photonic border node
when the connection mode between the electrical sub-networks is changed by the connection mode setup device, the exchanging device exchanges optical path establishment change information including information detailing the change, with other photonic border nodes,
the gathering device gathers network topology information based on a plurality of pieces of the optical path establishment change information exchanged by the exchanging device, and
the notification device notifies the electrical border nodes about the network topology information gathered by the gathering device.

19. An optical/electrical path integrated network comprising:
a plurality of electrical sub-networks comprising electrical border nodes and electrical core nodes which are interconnected by electrical paths, in which routing is performed based on packet header information; and
a photonic core network comprising photonic border nodes and photonic core nodes which are interconnected by optical paths
wherein the photonic core network and the plurality of electrical sub-networks are interconnected over optical paths by the electrical border nodes,
the electrical border nodes comprise a device which outputs to the photonic border nodes information relating to guantity of traffic between an own electrical sub-network and other electrical sub-networks,
the electrical sub-networks exchange data in packet units,
the phetonic core network interconnects the electrical sub-networks,
the electrical border nodes and the photonic border nodes which are provided in the electrical sub-network and the photonic core network adjacent to the electrical sub-network respectively are connected,
the photonic border nodes comprise:
a first storage device which stores topology information for the photonic core network;
a first calculating device which calculates a shortest path between the photonic border nodes based on the topology information stored in the first storage device; and
an optical path establishment device which establishes optical paths over the shortest path calculated by the first calculating device, the electrical border nodes comprise:

a second storage device which stores topology information for a network constructed from optical paths established over the photonic core network;
a second calculating device which calculates a shortest path between the electrical border nodes based on the topology information stored in the second storage device; and
an electrical path establishment device which establishes electrical paths over the shortest path calculated by the second calculating device,
there is provided a detection device which detects two electrical sub-networks which are exchanging a highest quantity of traffic from among electrical sub-networks which are not yet connected by an optical path, and
the optical path establishment device establishes optical paths between the two electrical sub-networks detected by the detection device.

20. An optical/electrical path integrated network according to claim 19, wherein the electrical path establishment device establishes an electrical path over a shortest path between electrical sub-networks on an optical path established by the optical path establishment device,
wherein the optical/electrical path integrated network further comprises;
a virtual routing device which performs virtual routing over the electrical path established by the electrical path establishment device,
a congested optical path detection device which detects congested locations on optical paths based on a result of the virtual routing performed by the virtual routing device; and
a new optical path establishment device which when a congested optical path as detected by the congested optical path detection device does not connect the electrical sub-networks which are causing the congestion, newly establishes an optical path which connects the electrical sub-networks.

21. An optical/electrical path integrated network according to claim 20, further comprising:
a determining device which determines whether or not the usage ratio of the optical path established by either one of the optical path establishment device and the new optical path establishment device is equal to or above a threshold value $\alpha$;
a multi-hop electrical path detection device which detects those electrical paths which do not connect the electrical sub-networks which travel optical paths which have the usage ratio equal to or greater than the threshold value $\alpha$, based on the results of the determining device;
a selection device which selects an electrical path which carries a highest quantity of traffic from the electrical paths detected by the multi-hop electrical path detection device; and
an optical path adding device which establishes an optical path so that an electrical path selected by the selection device connects the electrical sub-networks.

22. An optical/electrical path integrated network according to claim 21, wherein the determining device determines whether or not the usage ratio of the optical paths established by any one of the optical path establishment device, the new optical path establishment device, and the optical path adding device is equal to or below a threshold value $\beta$, and
the optical/electrical path integrated network further comprises a bypassing device which virtually bypasses electrical paths established over an optical path which has the usage ratio equal to or below the threshold value β to another optical path, based on a result of the determining device, the congested optical path detection device detects the congested locations on the optical paths after virtual bypassing is performed by the bypassing device, and the optical/electrical path integrated network further comprises a releasing device which actually releases optical paths which have the usage ratio equal to or below the threshold value β after the virtual bypassing has actually been performed by the bypassing device when congested optical paths are not detected by the congested optical path detection device.

23. An optical/electrical path integrated network according to claim 20, wherein the optical/electrical path integrated network further comprises:

a determining device which determines whether or not the usage ratio of the optical paths established by either one of the optical path establishment device and the new optical path establishment device is equal to or below a threshold value β; and a bypassing device which virtually bypasses electrical paths established over an optical path which has the usage ratio equal to or below the threshold value β to another optical path, based on a result of the determining device, the congested optical path detection device detects congested locations on optical paths after virtual bypassing is performed by the bypassing device, and the optical/electrical path integrated network further comprises a releasing device which actually releases optical paths which have the usage ratio equal to or below the threshold value β after the virtual bypassing has actually been performed by the bypassing device when congested optical paths are not detected by the congested optical path detection device.

24. An optical/electrical path integrated network according to claim 19, comprising:

a determining device which determines whether or not the usage ratio of the optical path established by the optical path establishment device is equal to or above a threshold value α;

a multi-hop electrical path detection device which detects those electrical paths which do not connect the electrical sub-networks which travel optical paths which have the usage ratio equal to or greater than the threshold value α, based on the results of the determining device;

a selection device which selects an electrical path which carries a highest quantity of traffic from the electrical paths detected by the multi-hop electrical path detection device, and an optical path adding device which establishes an optical path so that the electrical path selected by the selection device directly connects the electrical sub-networks.

25. An optical/electrical path integrated network according to claim 24, wherein the determining device determines whether or not the usage ratio of the optical paths established by either one of the optical path establishment device and the optical path adding device is equal to or below a threshold value β, and the optical/electrical path integrated network further comprises:

a bypassing device which virtually bypasses electrical paths established over an optical path which has the usage ratio equal to or below the threshold value β to another optical path, based on a result of the determining device;

a congested optical path detection device which detects congested locations on optical paths after virtual bypassing is performed by the bypassing device; and a releasing device which actually releases optical paths which have the usage ratio equal to or below the threshold value β after the virtual bypassing has actually been performed by the bypassing device when congested optical paths are not detected by the congested optical path detection device.

26. An optical/electrical path integrated network according the claim 19, further comprising:

a determining device which determines whether or not the usage ratio of the optical paths established by the optical path establishment device is equal to or below a threshold value β;

a bypassing device which virtually bypasses electrical paths established over an optical path which has the usage ratio equal to or below the threshold value β to another optical path, based on a result of the determining device;

a congested optical path detection device which detects congested locations on optical paths after virtual bypassing is performed by the bypassing device; and a releasing device which actually releases optical paths which have the usage ratio equal to or below the threshold value β after the virtual bypassing has actually been performed by the bypassing device when congested optical paths are not detected by the congested optical path detection device.

27. A program embodied as computer executable instructions on a computer readable medium of an information processing device enables the information processing device to realize functions required of an apparatus which controls electrical border nodes and photonic border nodes provided in an optical/electrical integrated network which includes a plurality of electrical sub-networks comprising the electrical border nodes and electrical core nodes in which routing is performed based on packet header information and a photonic core network comprising the photonic border nodes and photonic core nodes which are interconnected by optical paths, the photonic core network and the plurality of electrical sub-networks being interconnected by optical paths, the program allowing the electrical border nodes in the electrical sub-networks to realize:

a measuring function which measures traffic quantity between an own electrical sub-network and other electrical sub-networks; and a notification function which notifies the photonic border nodes in the photonic core network about information relating to traffic quantity measured by the measuring function, and allowing the photonic border nodes in the photonic core network to realize:

an exchanging function which exchanges the information relating to traffic quantity received from an electrical border node with other photonic border nodes, a gathering function which gathers information relating to traffic quantity between the plurality of electrical sub-networks based on a plurality of pieces of the information relating to traffic quantity exchanged by the exchanging function, and a connection mode setup function which sets up a connection mode between the electrical sub-networks based on the information relating to traffic guantity gathered by the gathering function.

28. A program according the claim 27, in which the connection mode setup function realizes a distance setup function which sets up a distance between electrical sub-networks, between which traffic is generated, in inverse proportion to the traffic quantity.

29. A program according to claim 27, wherein, when a connection mode between the electrical sub-networks is changed by the connection mode setup function, the exchanging function exchanges optical path establishment change information including information detailing the change with other photonic border nodes, the gathering function gathers network topology information based on a plurality of pieces of the optical path establishment change information exchanged by the exchanging function, and the notification function which notifies the electrical border nodes about the network topology information gathered by the gathering function.

30. A program embodied as computer executable instructions on a computer readable medium of an information processing device enables the information processing device to realize functions required of an apparatus which controls electrical border nodes and photonic border nodes provided in an optical/electrical integrated network which includes a plurality of electrical sub-networks comprising the electrical border nodes and electrical core nodes in which routing is performed based on packet header information and a photonic core network comprising the photonic border nodes and photonic core nodes which are interconnected by optical paths, the photonic core network and the plurality of electrical sub-networks being interconnected by optical paths allowing the electrical border nodes to realize:

a function which outputs to the photonic border nodes information relating to quantity of traffic between an own electrical sub-network and other electrical sub-networks, and the program allowing the photonic border nodes to realize:

a first storage function which stores topology information for the photonic core network;

a first calculating function which calculates a shortest path between the photonic border nodes based on the topology information stored by the first storage function;

an optical path establishment function which establishes an optical path over the shortest path calculated by the first calculating function;

a second storage function which stores topology information for a network constructed from optical paths established over the photonic core network;

a second calculating function which calculates a shortest path between the electrical border nodes based on the topology information stored by the second storage function;

an electrical path establishment function which establishes an electrical path over the shortest path calculated by the second calculating function; and a detection function which detects two electrical sub-networks which are exchanging a highest quantity of traffic from among electrical sub-networks which are not yet connected by an optical path, and wherein the optical path establishment function establishes an optical path between the two electrical sub-networks detected by the detection function.

31. A program according to claim 30, which allows the electrical path establishment function to establish a n electrical path over a shortest distance between electrical sub-networks on an optical path established by the optical path establishment function, and further realizes:

a virtual routing function which performs virtual routing over the electrical path established by the electrical path establishment function;

a congested optical path detection function which detects congested locations on optical paths based on results of the virtual routing performed by the virtual routing function; and a new optical path establishment function which when a congested optical path as detected by the congested optical path detection function does not connect the electrical sub-networks which are causing the congestion, newly establishes an optical path which connects the electrical sub-networks.

32. A program according to claim 31, further realizing:

a determining function which determines whether or not the usage ratio of the optical path established by either one of the optical path establishment function and the new optical path establishment function is equal to or above threshold value $\alpha$;

a multi-hop electrical path detection function which detects those electrical paths which do not connect electrical sub-networks and which travel optical paths which have the usage ratio equal to or greater than the threshold value $\alpha$, based on the results of the determining function;

a selection function which selects an electrical path which carries a highest quantity of traffic from the electrical paths detected by the multi-hop electrical path detection function; and an optical path adding function which establishes an optical path so that the electrical path selected by the selection function connects the electrical sub-networks.

33. A program according to claim 32, wherein the determining function determines whether or not the usage ratio of the optical paths established by either one of the optical path establishment function, the new optical path establishment function, and the optical path adding function is equal to or below a threshold value $\beta$, the program further realizes a bypassing function which virtually bypasses electrical paths established over an optical path which has the usage ratio equal to or below the threshold value $\beta$ to another optical path, based on a result of the determining function, the congested optical path detection function detects congested locations on the optical paths after virtual bypassing is performed by the bypassing function, and the program further realizes a releasing function which actually releases optical paths which have the usage ratio equal to or below the threshold value $\beta$ after the virtual bypassing has actually been performed by the bypassing function when congested optical paths are not detected by the congested optical path detection function.

34. A program according to claim 31, which realizes a determining function which determines whether or not the usage ratio of the optical paths established by either one of the optical path establishment function and the new optical path establishment function is equal to or below a threshold value $\beta$, the program further realizes a bypassing function which virtually bypasses electrical paths established over an optical path which has the usage ratio equal to or below the threshold value $\beta$ to another optical path, based on a result of the determining function, the congested optical path detection the function detects congested locations on the optical paths after virtual bypassing is performed by the bypassing function, and the program further realizes a releasing function which actually releases optical paths which have the usage ratio equal to or below the threshold value β after the virtual bypassing has actually been performed by the bypassing function when congested optical paths are not detected by the congested optical path detection function.

35. A program according to claim 30, which realizes a determining function which determines whether or not the usage ratio of the optical path established by the optical path establishment function is equal to or above a threshold value α, and the program further realizes:
a multi-hop electrical path detection function which detects those electrical paths which do not connect the electrical sub-networks which travel optical paths which have the usage ratio equal to or above the threshold value α, based on the results of the determining function;
a selection function which selects an electrical path which carries a highest quantity of traffic from the electrical paths detected by the multi-hop electrical path detection function; and
an optical path adding function which establishes an optical path so that the electrical path selected by the selection function connects the electrical sub-networks.

36. A program according to claim 35, wherein the determining function determines whether or not the usage ratio of the optical paths established by either one of the optical path establishment function and the optical path adding function is equal to or below a threshold value β, and the program further realizes:
a bypassing function which virtually bypasses electrical paths established over an optical path which has the usage ratio equal to or below the threshold value β to another optical path, based on a result of the determining function;
a congested optical path detection function which detects congested locations on optical paths after virtual bypassing is performed by the bypassing function; and
a releasing function which actually releases optical paths which have the usage ratio equal to or below the threshold value β after the virtual bypassing has actually been performed by the bypassing function when congested optical paths are not detected by the congested optical path detection function.

37. A program according to claim 30, which realizes:
a determining function which determines whether or not the usage ratio of the optical paths established by the optical path establishment function is equal to or below a threshold value β;
a bypassing function which virtually bypasses electrical paths established over an optical path which has the usage ratio equal to or below the threshold value β to another optical path, based on a result of the determining function;
a congested optical path detection function which detects congested locations on optical paths after virtual bypassing is performed by the bypassing function; and
a releasing function which actually releases optical paths which have the usage ratio equal to or below the threshold value β after the virtual bypassing has actually been performed by the bypassing function when congested optical paths are not detected by the congested optical path detection function.

38. A path establishment method, used with an optical/electrical path integrated network comprising electrical sub-networks which exchange data in packet units and a photonic core network which interconnects the electrical sub-networks, in which the photonic core network comprises a photonic border node and a photonic core node, and the electrical sub-networks comprise an electrical border node and an electrical core node, and the electrical border node and the photonic border node provided in the electrical sub-network and the photonic core network adjacent to the electrical sub-networks are connected, comprising the steps of:

the photonic border node stores topology information for the photonic core network;
the photonic border node calculates a shortest path between photonic border nodes based on the stored topology information of the photonic core network;
the photonic border node establishes an optical path over the calculated shortest path between the photonic border nodes;
the electrical border node stores topology information for a network constructed from optical paths established over the photonic core network;
the electrical border node calculates a shortest path between electrical border nodes based on the stored topology information of the network;
the electrical border node establishes an electrical path over the calculated shortest path between the electrical border nodes;
the electrical border node detects two electrical sub-networks which are exchanging a highest quantity of traffic from among electrical sub-networks which are not yet connected by an optical path; and
the electrical border node establishes an optical path between the two detected electrical sub-networks.

39. A path establishment method according to claim 38, wherein
an electrical path is established over a shortest path between the electrical sub-networks on the established optical path,
virtual routing is performed over the established electrical path,
congested locations on the optical path are detected based on a result of the virtual routing, and
when a congested optical path as shown by the detection results does not connect the electrical sub-networks which are causing the congestion, a new optical path is established which connects the electrical sub-networks.

40. A path establishment method according to claim 39, further comprising the steps of:
determining whether the usage ratio of an established optical path is equal to or above a threshold value α;
detecting electrical paths which traverse an optical path determined to have the usage ratio equal to or above the threshold a and do not connect electrical sub-networks;
selecting an electrical path with a highest traffic quantity from the detected electrical paths, and
establishing an optical path so that the selected electrical path connects the electrical sub-networks.

41. A path establishment method according to claim 40, further comprising the steps of:
determining whether the usage ratio of an established optical path is equal to or below a threshold of β;

virtually bypassing electrical paths established over optical paths determined to have the usage ratio equal to or below a threshold value β to other optical paths;

detecting congested locations present on the optical paths after the virtual bypassing is performed; and when congested optical paths are not detected, actually releasing optical paths which have the usage ratio equal to or below the threshold value β after the virtual bypassing is actually performed.

42. A path establishment method according to claim 39, further comprising the steps of:

determining whether the usage ratio of an established optical path is equal to or below a threshold value β;

virtually bypassing electrical paths established over optical paths determined to have the usage ratio equal to or below the threshold value β to other optical paths;

detecting congested locations present on the optical paths after the virtual bypassing is performed; and when congested optical paths are not detected, actually releasing optical paths which have the usage ratio equal to or below the threshold value β after the virtual bypassing is actually performed.

43. A path establishment method according to claim 38, further comprising the steps of:

determining whether the usage ratio of an established optical path is equal to or above a threshold value α;

detecting electrical paths which traverse an optical path determined to have the usage ratio equal to or above the threshold value α and do not connect electrical sub-networks;

selecting an electrical path with a highest traffic quantity from the detected electrical paths; and establishing an optical path so that the selected electrical path connects the electrical sub-networks.

44. A path establishment method according to claim 43, further comprising the steps of:

determining whether the usage ratio of an established optical path is equal to or below a threshold value β;

virtually bypassing electrical paths established over optical paths determined to have the usage ration equal to or below the threshold value β to other optical paths;

detecting congested locations present on the optical paths after the virtual bypassing is performed; and when congested optical paths are not detected, actually releasing optical paths which have the usage ratio equal to or below the threshold value β after the virtual bypassing is actually performed.

* * * * *